US012000090B2

(12) United States Patent
Crosetto

(10) Patent No.: US 12,000,090 B2
(45) Date of Patent: Jun. 4, 2024

(54) TREATED ARTICLE, METHODS OF MAKING THE TREATED ARTICLE, AND DISPERSION FOR USE IN MAKING THE TREATED ARTICLE

(71) Applicant: AGC CHEMICALS AMERICAS, INC., Exton, PA (US)

(72) Inventor: Tess Duffin Crosetto, Garnet Valley, PA (US)

(73) Assignee: AGC CHEMICALS AMERICAS, INC., Exton, PA (US)

( * ) Notice: Subject to any disclaimer, the term of this patent is extended or adjusted under 35 U.S.C. 154(b) by 180 days.

(21) Appl. No.: 17/498,221

(22) Filed: Oct. 11, 2021

(65) Prior Publication Data

US 2022/0178078 A1 Jun. 9, 2022

Related U.S. Application Data

(60) Provisional application No. 63/212,776, filed on Jun. 21, 2021, provisional application No. 63/121,500, filed on Dec. 4, 2020.

(51) Int. Cl.

| | |
|---|---|
| ***D21H 17/00*** | (2006.01) |
| ***B05D 7/26*** | (2006.01) |
| ***D21H 17/14*** | (2006.01) |
| ***D21H 17/34*** | (2006.01) |
| ***D21H 17/37*** | (2006.01) |
| ***D21H 17/56*** | (2006.01) |
| ***D21H 17/60*** | (2006.01) |
| ***D21H 19/18*** | (2006.01) |
| ***D21H 19/20*** | (2006.01) |
| ***D21H 21/10*** | (2006.01) |
| ***D21H 21/16*** | (2006.01) |

(52) U.S. Cl.

CPC ............... *D21H 17/72* (2013.01); *B05D 7/26* (2013.01); *D21H 17/14* (2013.01); *D21H 17/34* (2013.01); *D21H 17/375* (2013.01); *D21H 17/56* (2013.01); *D21H 17/60* (2013.01); *D21H 19/18* (2013.01); *D21H 19/20* (2013.01); *D21H 21/10* (2013.01); *D21H 21/16* (2013.01)

(58) Field of Classification Search

CPC ........ D21H 17/72; D21H 17/14; D21H 17/60; D21H 21/16; D21H 17/56; D21H 17/375; D21H 21/10; D21H 17/34

USPC .......................................................... 524/394

See application file for complete search history.

(56) References Cited

U.S. PATENT DOCUMENTS

| | | | |
|---|---|---|---|
| 3,847,637 | A | 11/1974 | Luszczak |
| 4,421,602 | A | 12/1983 | Brunnmueller et al. |
| 4,880,497 | A | 11/1989 | Pfohl et al. |
| 5,145,559 | A | 9/1992 | Auhorn et al. |
| 5,262,008 | A | 11/1993 | Moench et al. |
| 5,846,663 | A | 12/1998 | Brungardt et al. |
| 6,007,906 | A | 12/1999 | Bottorff et al. |
| 6,048,392 | A | 4/2000 | Brungardt et al. |
| 6,197,417 | B1 | 3/2001 | Bottorff |
| 6,294,645 | B1 | 9/2001 | Allen et al. |
| 6,316,095 | B1 | 11/2001 | Black et al. |
| 6,325,893 | B1 | 12/2001 | Brungardt et al. |
| 6,429,267 | B1 | 8/2002 | Riehle |
| 6,554,961 | B1 | 4/2003 | Riehle et al. |
| 6,576,049 | B1 | 6/2003 | Dilts et al. |
| 6,616,806 | B2 | 9/2003 | I Chen |
| 6,723,204 | B2 | 4/2004 | Van Handel et al. |
| 6,746,542 | B1 | 6/2004 | Lorencak et al. |
| 6,808,597 | B2 | 10/2004 | Allen |
| 6,824,650 | B2 | 11/2004 | Lindsay et al. |
| 6,906,133 | B2 | 6/2005 | Deng et al. |
| 6,908,983 | B2 | 6/2005 | Maslanka |
| 6,951,962 | B2 | 10/2005 | Bottorff |
| 6,969,444 | B2 | 11/2005 | Linhart et al. |
| 7,090,745 | B2 | 8/2006 | Beckman et al. |
| 7,166,192 | B2 | 1/2007 | van de Steeg et al. |
| 7,175,740 | B2 | 2/2007 | Riehle et al. |
| 7,214,633 | B2 | 5/2007 | Sun et al. |
| 7,270,727 | B2 | 9/2007 | Varnell |
| 7,282,273 | B2 | 10/2007 | Murphy et al. |
| 7,306,701 | B2 | 12/2007 | Blum et al. |
| 7,641,765 | B2 | 1/2010 | Blum et al. |
| 7,726,592 | B2 | 6/2010 | Fernandez et al. |

(Continued)

FOREIGN PATENT DOCUMENTS

| | | | |
|---|---|---|---|
| CN | 1548649 | A | 11/2004 |
| CN | 101068986 | B | 10/2012 |

(Continued)

OTHER PUBLICATIONS

International Search Report for Application No. PCT/US2021/054370 dated Jan. 31, 2022, 3 pages.

(Continued)

*Primary Examiner* — Hui H Chin

(74) *Attorney, Agent, or Firm* — Howard & Howard Attorneys PLLC

(57) ABSTRACT

A treated article includes fibers, a sizing agent, and a retention aid. The sizing agent includes a wax or a component thereof having an acid value of from 10 mg to 220 mg, KOH/g as measured in accordance with USP 401. The retention aid includes a nitrogen-containing polymer independently selected from the group consisting of (i) a nitrogen-containing polymer of Formula I, (ii) a polyethyleneimine, (iii) a polyaminoamide, (iv) a copolymer formed from the reaction product of epichlorohydrin and dimethylamine, and (v) combinations thereof.

21 Claims, No Drawings

(56) References Cited

U.S. PATENT DOCUMENTS

| | | | |
|---|---|---|---|
| 7,828,934 | B2 | 11/2010 | Cyr et al. |
| 7,854,800 | B2 | 12/2010 | Ehrhardt |
| 7,879,917 | B2 | 2/2011 | Cheng et al. |
| 7,902,213 | B2 | 3/2011 | Statham et al. |
| 7,932,349 | B2 | 4/2011 | Riehle et al. |
| 7,943,705 | B2 | 5/2011 | Allen |
| 7,981,247 | B2 | 7/2011 | Fernandez et al. |
| 7,998,311 | B2 | 8/2011 | Varnell |
| 8,052,840 | B2 | 11/2011 | Sharoyan |
| 8,101,710 | B2 | 1/2012 | Riehle et al. |
| 8,163,134 | B2 | 4/2012 | Sutman et al. |
| 8,206,553 | B2 | 6/2012 | Gelman et al. |
| 8,299,180 | B2 | 10/2012 | Wright |
| 8,308,902 | B2 | 11/2012 | Sutman et al. |
| 8,349,134 | B2 | 1/2013 | Esser et al. |
| 8,425,725 | B2 | 4/2013 | Buwono et al. |
| 8,425,726 | B2 | 4/2013 | Buwono et al. |
| 8,440,768 | B2 | 5/2013 | Lu et al. |
| 8,444,818 | B2 | 5/2013 | Sutman et al. |
| 8,486,227 | B2 | 7/2013 | Esser et al. |
| 8,506,757 | B2 | 8/2013 | Gu et al. |
| 8,512,520 | B2 | 8/2013 | Schmid et al. |
| 8,518,215 | B2 | 8/2013 | McKay et al. |
| 8,518,216 | B2 | 8/2013 | Sutman et al. |
| 8,524,042 | B2 | 9/2013 | Zhang et al. |
| 8,604,134 | B2 | 12/2013 | Gu et al. |
| 8,609,757 | B2 | 12/2013 | Broecher et al. |
| 8,632,659 | B2 | 1/2014 | Ehrhardt et al. |
| 8,636,875 | B2 | 1/2014 | McKay |
| 8,647,470 | B2 | 2/2014 | Esser |
| 8,685,207 | B2 | 4/2014 | Song et al. |
| 8,696,869 | B2 | 4/2014 | Borkar et al. |
| 8,758,567 | B2 | 6/2014 | Brungardt |
| 8,771,469 | B2 | 7/2014 | Cyr et al. |
| 8,822,586 | B2 | 9/2014 | Bellmann et al. |
| 8,865,263 | B2 | 10/2014 | Sharoyan et al. |
| 8,871,055 | B2 | 10/2014 | Ehrhardt |
| 8,894,816 | B2 | 11/2014 | Borkar |
| 8,900,412 | B2 | 12/2014 | Borkar et al. |
| 8,920,606 | B2 | 12/2014 | Wright |
| 9,005,398 | B2 | 4/2015 | Brungardt |
| 9,011,643 | B2 | 4/2015 | Gu et al. |
| 9,034,146 | B2 | 5/2015 | Mahoney et al. |
| 9,051,687 | B2 | 6/2015 | Esser et al. |
| 9,080,288 | B2 | 7/2015 | Hietaniemi et al. |
| 9,121,137 | B2 | 9/2015 | Viazmensky et al. |
| 9,145,646 | B2 | 9/2015 | Benz et al. |
| 9,206,551 | B2 | 12/2015 | Esser |
| 9,315,943 | B2 | 4/2016 | Cimpeanu et al. |
| 9,371,613 | B1 | 6/2016 | Lobo et al. |
| 9,404,223 | B2 | 8/2016 | Gray et al. |
| 9,580,866 | B2 | 2/2017 | Brungardt |
| 9,580,868 | B2 | 2/2017 | Brungardt |
| 9,587,354 | B2 | 3/2017 | Brungardt |
| 9,598,820 | B2 | 3/2017 | Houze |
| 9,631,319 | B2 | 4/2017 | Gray |
| 9,702,086 | B2 | 7/2017 | Castro et al. |
| 9,708,771 | B2 | 7/2017 | Haufe et al. |
| 9,719,212 | B2 | 8/2017 | Crisp et al. |
| 9,765,482 | B2 | 9/2017 | Cutts |
| 9,765,483 | B2 | 9/2017 | Esser et al. |
| 9,783,933 | B2 | 10/2017 | Borkar et al. |
| 9,873,982 | B2 | 1/2018 | Harrington et al. |
| 9,879,380 | B2 | 1/2018 | Borkar et al. |
| 9,879,381 | B2 | 1/2018 | Wright |
| 9,896,358 | B2 | 2/2018 | Pereira et al. |
| 9,920,482 | B2 | 3/2018 | Benz et al. |
| 10,047,480 | B2 | 8/2018 | Buchan et al. |
| 10,113,270 | B2 | 10/2018 | Gray et al. |
| 10,227,621 | B2 | 3/2019 | Braun et al. |
| 10,246,568 | B2 | 4/2019 | Strey et al. |
| 10,253,214 | B2 | 4/2019 | Ling et al. |
| 10,597,824 | B2 | 3/2020 | Coutinho et al. |
| 10,689,809 | B2 | 6/2020 | Faucher et al. |
| 10,844,543 | B2 | 11/2020 | Pang et al. |
| 10,844,544 | B2 | 11/2020 | Sharoyan et al. |
| 10,851,498 | B2 | 12/2020 | McKay |
| 10,865,525 | B2 | 12/2020 | Ehrhardt et al. |
| 10,865,526 | B2 | 12/2020 | Ehrhardt et al. |
| 10,876,254 | B2 | 12/2020 | Harrington et al. |
| 10,876,258 | B2 | 12/2020 | Aittamaa |
| 10,941,524 | B2 | 3/2021 | Barton et al. |
| 10,975,524 | B2 | 4/2021 | Lewis et al. |
| 2003/0135939 | A1 | 7/2003 | Sun et al. |
| 2004/0118540 | A1 | 6/2004 | Garnier et al. |
| 2004/0142840 | A1 | 7/2004 | de Buzzaccarini et al. |
| 2006/0065380 | A1 | 3/2006 | Garnier et al. |
| 2007/0092718 | A1 | 4/2007 | Murphy et al. |
| 2007/0107864 | A1 | 5/2007 | Hahnle et al. |
| 2007/0261807 | A1 | 11/2007 | Taggart et al. |
| 2008/0066881 | A1 | 3/2008 | Riehle et al. |
| 2009/0098303 | A1 | 4/2009 | Murphy et al. |
| 2010/0000693 | A1* | 1/2010 | Champ .................. D21F 11/04 162/123 |
| 2010/0038043 | A1 | 2/2010 | Sharoyan |
| 2010/0071863 | A1 | 3/2010 | Sutman et al. |
| 2010/0147476 | A1 | 6/2010 | Gu et al. |
| 2010/0310776 | A1 | 12/2010 | Brungardt |
| 2011/0155339 | A1 | 6/2011 | Brungardt et al. |
| 2012/0045587 | A1 | 2/2012 | Sharoyan et al. |
| 2012/0103546 | A1 | 5/2012 | Maniere |
| 2012/0180970 | A1 | 7/2012 | Song et al. |
| 2012/0248366 | A1 | 10/2012 | Ehrhardt |
| 2013/0186584 | A1 | 7/2013 | Krapsch et al. |
| 2014/0124155 | A1 | 5/2014 | Jehn-Rendu |
| 2014/0174682 | A1 | 6/2014 | Brungardt |
| 2014/0275415 | A1 | 9/2014 | Cimpeanu et al. |
| 2014/0284011 | A1* | 9/2014 | Krapsch ................ D21H 17/28 162/168.3 |
| 2014/0311696 | A1 | 10/2014 | Viazmensky et al. |
| 2016/0298297 | A1 | 10/2016 | Borkar et al. |
| 2017/0009100 | A1 | 1/2017 | Ling et al. |
| 2018/0051417 | A1 | 2/2018 | Harrington et al. |
| 2018/0080175 | A1 | 3/2018 | McKay |
| 2018/0274175 | A1 | 9/2018 | Gerstenhaber et al. |
| 2019/0048530 | A1 | 2/2019 | Faucher et al. |
| 2019/0078258 | A1 | 3/2019 | Nicholson |
| 2019/0218718 | A1 | 7/2019 | Lewis et al. |
| 2019/0309480 | A1 | 10/2019 | Luo et al. |
| 2019/0359739 | A1 | 11/2019 | Wright |
| 2020/0217015 | A1 | 7/2020 | Jehn-Rendu et al. |
| 2020/0240084 | A1 | 7/2020 | Hamers et al. |
| 2020/0277735 | A1 | 9/2020 | Borkar et al. |
| 2020/0325627 | A1 | 10/2020 | Sharoyan et al. |
| 2021/0047780 | A1 | 2/2021 | Sharoyan et al. |
| 2022/0195672 | A1 | 6/2022 | Campbell et al. |

FOREIGN PATENT DOCUMENTS

| | | | |
|---|---|---|---|
| EP | 1491682 | A1 | 12/2004 |
| WO | 2005059251 | A1 | 6/2005 |
| WO | 2013070489 | A1 | 5/2013 |
| WO | 2017034774 | A1 | 3/2017 |
| WO | 2020033961 | A1 | 2/2020 |
| WO | 2020053379 | A1 | 3/2020 |
| WO | 2020205907 | A1 | 10/2020 |

OTHER PUBLICATIONS

International Search Report for Application No. PCT/US2021/054372 dated Feb. 3, 2022, 3 pages.

English language abstract and machine-assisted English translation for CN 1548649 A extracted from espacenet.com database on Feb. 7, 2022, 10 pages.

Horine, Pamela et al., "Chemicals to Rest: An Open-Source Guide to PFA-Free Packaging", Zume Solenis, 2020, 6 pages.

Hutchinson, Larry, "PFAS-Free Oil and Grease Resistant Technology for Molded Pulp Food Service Applications", Solenis LLC, 2021, 21 pages.

OECD, "PFASs and Alternatives in Food Packaging (Paper and Paperboard): Report on the Commerical Availability and Current Uses", Series on Risk Management No. 58, 2020, 67 pages.

(56) References Cited

OTHER PUBLICATIONS

English language abstract for CN 101068986 B extracted from espacenet.com database on Oct. 18, 2021, 1 page.

* cited by examiner

TREATED ARTICLE, METHODS OF MAKING THE TREATED ARTICLE, AND DISPERSION FOR USE IN MAKING THE TREATED ARTICLE

CROSS-REFERENCE TO RELATED APPLICATIONS

This application claims priority to and all the advantages of U.S. Provisional Patent Application No. 63/212,776 filed on Jun. 21, 2021 and U.S. Provisional Patent Application No. 63/121,500 filed on Dec. 4, 2020, the disclosures of which are incorporated by reference in their entirety.

FIELD OF THE DISCLOSURE

The following disclosure relates to a treated article, methods of making the treated article, and a dispersion for use in making the treated article.

BACKGROUND OF THE DISCLOSURE

High performance treated articles (e.g. paper products) typically derive their performance from the inclusion of a fluoropolymer. Recent global trends towards the reduction of fluorine content in treated articles, especially articles used in the food industry, have resulted in articles that are considered more environmentally friendly. However, these environmentally friendly articles typically lack certain performance properties in comparison to their fluorine containing counterparts. Therefore, an opportunity remains to develop improved treated article, or a dispersion for making improved treated articles, having high performance.

SUMMARY OF THE DISCLOSURE AND ADVANTAGES

The present disclosure provides a treated article. The treated article includes fibers, a sizing agent, and a retention aid. The sizing agent includes a wax or a component thereof having an acid value of from 10 mg to 220 mg, KOH/g as measured in accordance with USP 401. The retention aid includes a nitrogen-containing polymer independently selected from the group consisting of (i) a nitrogen-containing polymer of Formula I, (ii) a polyethyleneimine, (iii) a polyaminoamide, (iv) a copolymer formed from the reaction product of epichlorohydrin and dimethylamine, and (v) combinations thereof.

The present disclosure also provides a dispersion for use in making the treated article. The dispersion includes a solvent, the sizing agent, and the retention aid.

The treated article is typically fluorine-free and has an excellent balance of performance properties. Specifically, the synergistic combination of the sizing agent and the retention aid results in the treated article having excellent corn oil bleedthrough prevention/resistance and hot water repellency.

DETAILED DESCRIPTION

The present disclosure provides a dispersion for use in making a treated article. The dispersion includes three main components, a solvent, a sizing agent and a retention aid.

Referring first to the solvent, the solvent may include a variety of solvating liquids or may include a single liquid. The solvent generally includes at least water. Other liquids that may optionally be included in the solvent are liquids that are miscible with water. Specific examples of the water-miscible solvent include at least one solvent selected from the group of propylene glycol, dipropylene glycol, tripropylene glycol, propylene glycol monomethyl ether, propylene glycol monoethyl ether, dipropylene glyocol monomethyl ether, dipropylene glycol monoether ether, tripropylene glycol monomethyl ether, diacetone alcohol, and combinations thereof. Most typically, the solvent includes water or a combination of water and at least one water-miscible solvent selected from the group of propylene glycol, dipropylene glycol and tripropylene glycol.

The dispersion generally includes the solvent in an amount of at least 40 parts by weight, based on 100 parts by weight of the dispersion. Alternatively, the dispersion may include the solvent in an amount of from 40 to 90, from 50 to 90, from 60 to 90, from 70 to 90, from 80 to 90, from 50 to 80, 60 to 80, or about 70, parts by weight based on 100 parts by weight of the dispersion. For example, the solvent may include water (e.g. tap water) and dipropylene glycol, with the water present in an amount of from 50 to 75 parts by weight and the dipropylene glycol present in an amount of from 15 to 40 parts by weight, each based on 100 parts by weight of the dispersion.

Referring now to the sizing agent, the sizing agent includes a wax or component thereof. Persons having ordinary skill in the art understand that many waxes, particularly naturally occurring waxes, include a combination of individual components. For example, naturally occurring beeswax includes palmitate, palmitoleate, and oleate esters of long-chain (e.g. 30-32 carbons) aliphatic alcohols, with each individual component being a "component thereof" in relation to beeswax. For ease of reference, the term "wax or component thereof" will be collectively referred to as "wax" throughout the remaining description.

The wax of the sizing agent has an acid value of from 10 mg to 220 mg, KOH/g as measured in accordance with USP 401. Alternatively, the wax may have an acid value of from 10 to 200, 10 to 180, 10 to 160, 10 to 140, 10 to 120, 10 to 100, 10 to 80, 10 to 60, or 10 to 50, mg of KOH/g. Alternatively still, the wax may have an acid value of from 20 to 100, 20 to 80, 20 to 60, 25 to 45, or 150 to 220, mg of KOH/g. For the purposes of this disclosure, any reference to the acid value of the wax is expressing an acid value that was measured in accordance with USP 401.

Although the wax is not limited to any particular wax, provided the wax has an acid value from 10 mg to 220 mg, KOH/g, typically the wax is selected from a group consisting of a stearate, beeswax (both synthetic and natural), candelilla wax, palmitate, behenate, and combinations thereof. For example, the wax of the sizing agent may be beeswax or a stearate, or both. Alternatively, the wax may be behenate or palmitate, or both.

The wax is generally present within the dispersion in an amount of from 10 to 50 parts by weight, based on 100 parts by weight of the dispersion. Alternatively, the wax may be present in an amount of from 10 to 45, 10 to 40, 10 to 35, 15 to 50, 20 to 50, or 25 to 50, parts by weight based on 100 parts by weight of the dispersion.

Those skilled in the art understand that the sizing agent including the wax is useful in the process of making the treated article because, as described in further detail below, the sizing agent is capable of being fixed, retained, anchored, incorporated, oriented, etc., within or by fibers within the treated article. As also described in further detail below, the sizing agent may be referred to as an internal sizing agent, an external sizing agent, or both, depending on the particular method that incorporates the dispersion within the process of making the treated article.

Referring now to the retention aid, the retention aid includes a nitrogen-containing polymer selected from the group consisting of: (i) a nitrogen-containing polymer of Formula I, (ii) a polyethyleneimine, (iii) a polyaminoamide, (iv) a copolymer formed from the reaction product of epichlorohydrin and dimethylamine, and (v) combinations thereof.

The nitrogen-containing polymer according to Formula I is shown below:

Formula I

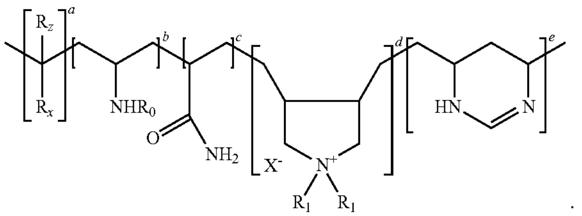

In Formula I, (a), (b), (c), (d), and (e) individually represent the molar percent of each repeating unit included in the nitrogen-containing polymer of Formula I. $R_0$ is independently selected from the group consisting of:
of hydrogen,

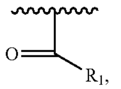

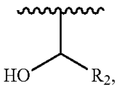

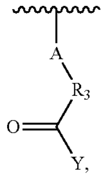

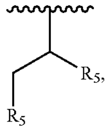

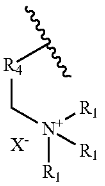

and combinations thereof. $R_z$ is independently selected from H, —$CH_3$, and combinations thereof. $R_x$ is independently selected from H, —OH, —COOH, —$COOR_1$, —$OCOR_1$, —$R_1$, —$R_3OH$, —$OR_1$, —$NR_1R_1$, —$R_3NH_2$, —$NH_2$, —$COO(CH_2)_2N(R_1)_2$, —$COO(CH_2)_3N(R_1)_2$, —$COO(CH_2)_2N+(R_1)_3X^-$, —$COO(CH_2)_3N+(R_1)_3X^-$, and combinations thereof, with the proviso that when $R_x$ is —$NH_2$, $R_z$ is —$CH_3$. Y is independently selected from H, —OH, —$R_1$, —$OR_1$, —$NR_1R_1$, —$NH_2$, and combinations thereof. Z is independently selected from H, —OH, —C═O, —$R_1$, —$OR_1$, —$NR_1R_1$, —$NH_2$ and combinations thereof. $R_1$ is independently selected from H, a straight chain or branched alkyl or alkenyl containing up to 22 carbons, and combinations thereof. $R_2$ is independently selected from H, a monosaccharide, an oligosaccharide, polysaccharide moiety, a straight or branched alkyl or alkenyl group up to 22 carbons optionally containing a hydroxyl or aldehyde group, and combinations thereof. $R_3$ is independently selected from a straight chain or branched alkyl or alkenyl containing up to 22 carbons or combinations thereof. $R_4$ is independently selected from a straight chain or branched alkyl group containing up to 18 carbons, optionally substituted with a hydroxyl group, and combinations thereof. $R_5$ is independently selected from H, —OH, —COOH, —$COOR_1$, —$OCOR_1$, —$R_1$, —$R_1OH$, —$OR_1$, —$CONH_2$, —CONHCHOHCHO, —$NR_1$, —$NR_1R_1$, —$R_1NH_2$, —$NH_2$, and combinations thereof. A is independently selected from C═O, —$CH_2$, and combinations thereof. Finally, $X^-$ is independently an anion.

As described above, (a), (b), (c), (d), and (e) of Formula I individually represent the molar percent of each repeating unit included in the nitrogen-containing polymer of Formula I. For ease of reference, the repeating unit with molar percent (a) will be referred to as repeating unit (a), the repeating unit with molar percent (b) will be referred to as repeating unit (b), the repeating unit with molar percent (c) will be referred to as repeating unit (c), the repeating unit with molar percent (d) will be referred to as repeating unit (d), and the repeating unit with molar percent (e) will be referred to as repeating unit (e). It should also be appreciated that the structural formula representing each individual repeating unit represents multiple discrete repeating units. The molar percent for each repeat unit is the combined molar percent of each discrete unit represented by the repeating unit. For example, when the nitrogen-containing polymer of Formula I includes repeating unit (b),

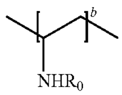

with R0 represented by

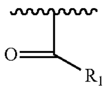

in an amount of 50 mol. % and repeating unit (b),

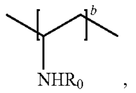

with R0 represented by

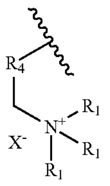

in an amount of 50 mol. %, the nitrogen-containing polymer includes repeating unit (b) in a combined total amount of 100 mol. %. It is also to be appreciated that the individual repeating units within the nitrogen-containing polymer of Formula I are randomly distributed.

The value of each individual molar percent represented by (a), (b), (c), (d), and (e) may range from 0 to 100 mol. %, with the sum of (a), (b), (c), (d), and (e) being 100 mol. %. This means that the nitrogen-containing polymer of Formula I does not include additional units that repeat within its structure. When the molar percent of (a) is zero, the nitrogen-containing polymer does not include repeating unit (a). Conversely, when the molar percent of (a) is 100, the nitrogen-containing polymer does not include repeats units (b), (c), (d), and (e).

Referring now to repeating unit (a),

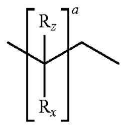, typically the molar percent of (a) within repeating unit (a) is less than 100 mol. %. In other words, typically when repeating unit (a) is included in the nitrogen-containing polymer of Formula I, the nitrogen-containing polymer includes at least one additional repeating unit. Typically, when repeating unit (a) is combined with additional repeating units, the molar percent (a) of repeating unit (a) is less than 30 mol. %. However, when the molar percent (a) of repeating unit (a) is 100 mol. %, $R_x$ is independently selected from —$NR_1R_1$, —$R_3NH_2$, —$NH_2$, —$COO(CH_2)_2N(R_1)_2$, —$COO(CH_2)_3N(R_1)_2$, —$COO(CH_2)_2N{+}(R_1)_3X^-$, —$COO(CH_2)_3N{+}(R_1)_3X^-$, and combinations thereof. In other words, when the molar percent of repeating unit (a) is 100 mol. %, $R_x$ is selected such that repeating unit (a) includes nitrogen.

Referring now to repeating unit (b),

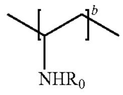, repeating unit (b) may be included in the nitrogen-containing polymer of Formula I in a molar percent from 0 to 100. When the nitrogen-containing polymer includes repeating unit (b), repeating unit (b) is typically included in an amount of at least 15 mol. %. Alternatively, the repeating unit (b) may be included in an amount of at least 30, 40, 50, 60, 70, 80, or 90, mol. %.

In certain embodiments, $R_0$ is independently selected from the group consisting of H,

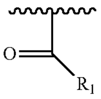, 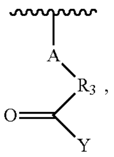 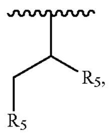 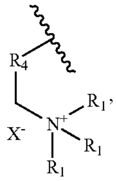

and combinations thereof. In other words, in these embodiments, $R_0$ does not include

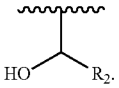

In other embodiment, $R_0$ is independently selected from the group consisting of H,

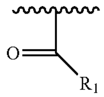, 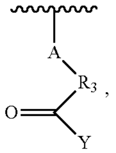 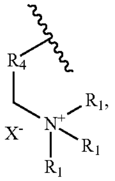

and combinations thereof. In still further embodiments, $R_0$ is independently selected from the group consisting of H,

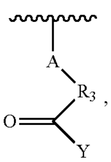 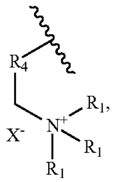

and combinations thereof. Although not required, in each of the embodiments within this paragraph, the combined molar percent of repeating units (c) and (d) is typically less than 5 mol. %. In other words, in these embodiments, the combined molar percent of repeating units (a), (b), and (e) is at least 95 mol. % and typically 100 mol. %.

In certain embodiments, the retention aid is the nitrogen-containing polymer of Formula I and the combined molar percent of repeating units (c) and (d) is less than 5 mol. %. Or said differently, in these embodiments, the retention aid is the nitrogen-containing polymer of Formula I and repeating units (a), (b), and (e) collectively represent at least 95 mol. % of the nitrogen-containing polymer. Alternatively, the retention aid is the nitrogen-containing polymer of Formula I and repeating units (a), (b), and (e) collectively represent at least 96, 97, 98, 99, or 100 mol. %.

When the retention aid is the nitrogen-containing polymer of Formula I and repeating units (a), (b), and (e) are collectively present at 100 mol. %, the nitrogen-containing polymer is represented by Formula II:

Formula II

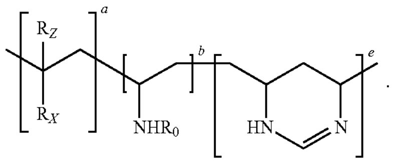

In certain embodiments when the retention aid is the nitrogen-containing polymer of Formula II, $R_0$ is independently selected from the group consisting of H,

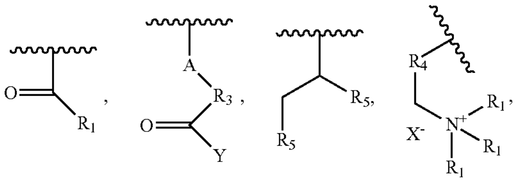

and combinations thereof. In other embodiments of Formula II, $R_0$ is independently selected from the group consisting of H,

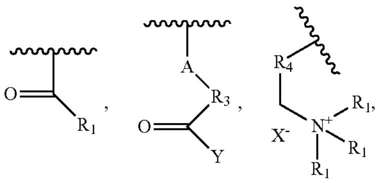

and combinations thereof. In still further embodiments of Formula II, $R_0$ is independently selected from the group consisting of H,

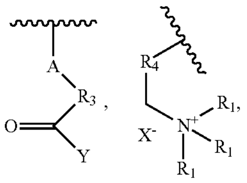

and combinations thereof.

In certain embodiments when the retention aid is the nitrogen-containing polymer of Formula II, the retention aid is independently selected from a group consisting of (i) the nitrogen-containing polymer of Formula II with the combined molar percent of (b) and (e) being 100 mol. %, and $R_0$ is independently selected from the group consisting of H,

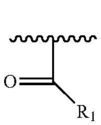

and combinations thereof, (ii) the nitrogen-containing polymer of Formula II with the molar percent of (a) being 100 mol. % with $R_x$ represented by $—R_3NH_2$, and (iii) the nitrogen-containing polymer of Formula II with the molar percent of (b) being 100 mol. %, and $R_0$ independently selected from the group consisting of H,

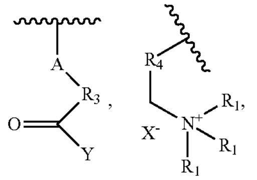

and combinations thereof. Within this embodiment, when the retention aid includes (i) the nitrogen-containing polymer of Formula II with the combined molar percent of (b) and (e) being 100 mol. %, and $R_0$ is independently selected from the group consisting of H,

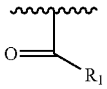

and combinations, the retention aid may be more narrowly defined as Formula IIa:

Formula IIa

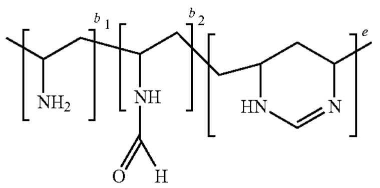

Likewise, within this embodiment, when the retention aid includes (ii) the nitrogen-containing polymer of Formula II with the molar percent of (a) being 100 mol. % with $R_x$ represented by $—R_3NH_2$, the retention aid may be more narrowly defined as Formula IIb:

Formula IIb

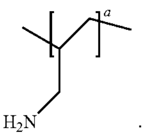

Likewise, within this embodiment, when the retention aid includes (iii) the nitrogen-containing polymer of Formula II with the molar percent of (b) being 100 mol. %, and $R_0$ independently

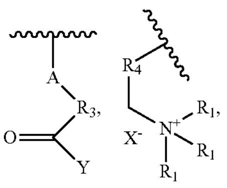

selected from the group consisting of H and combinations thereof, the retention aid may be more narrowly defined as Formula IIc:

Formula IIc

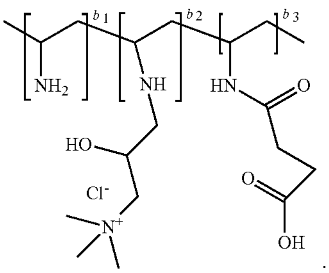

When the retention aid is represented by or includes Formula IIa, ($b_1$) and ($b_2$) represent the molar percent of the associated repeating unit, with the combined molar percent of ($b_1$) and ($b_2$) equal to the total molar percent of (b) in Formula II. In other words, repeating unit ($b_1$) is a first repeating unit derived from repeating unit (b) of Formula II and repeating unit ($b_2$) is a second repeating unit derived from repeating unit (b). Similarly, when the retention aid is represented by or includes Formula IIc, ($b_1$), ($b_2$), and ($b_3$) represent the molar percent of the associated repeating unit, with the combined molar percent of ($b_1$), ($b_2$), and ($b_3$) equal to the total molar percent of (b) in Formula II.

When the retention aid is or includes the nitrogen-containing polymer of Formula IIa, the nitrogen-containing polymer may be referred to as a partially hydrolyzed poly (n-vinylformamide). The degree of hydrolysis will determine the molar value of each repeating unit. Typically, the partially hydrolyzed poly(n-vinylformamide) is hydrolyzed from 30 to 70%, based on the total amount of functional groups that were capable of being hydrolyzed. Alternatively, the partially hydrolyzed poly(n-vinylformamide) may be hydrolyzed from 30 to 60, 40 to 70, 40 to 60, or about 50%, based on the total amount of functional groups that were capable of being hydrolyzed.

When retention aid is or includes the nitrogen-containing polymer of Formula IIb, the nitrogen-containing polymer may be referred to as a polyallylamine. Although not required, the polyallylamine typically has a weight average molecular weight of from 30,000 to 100,000 daltons. Alternatively, the polyallylamine may have a weight average molecular weight of from 30,000 to 90,000, from 30,000 to 80,000, from 30,000 to 70,000, from 40,000 to 90,000, from 50,000 to 80,000, from 60,000 to 70,000, or about 65,000, daltons.

When the retention aid is or includes the nitrogen-containing polymer of Formula IIc, the nitrogen-containing polymer may be referred to as formamide, N-ethenyl-, homopolymer, hydrolyzed, N-(3-carboxy-1-oxopropyl) N-[2-hydroxy-3-(trimethylammonio)propyl] derivatives, chlorides (CAS Reg. No. 945630-11-5). Although persons of skill in the art would readily recognize that multiple reaction pathways may be used to synthesize the nitrogen-containing polymer of Formula IIc, example 5 of U.S. Pat. No. 8,604,134 discloses a suitable process. The disclosure of U.S. Pat. No. 8,604,134, as it relates to the nitrogen-containing polymer of Formula IIc, is hereby incorporated by reference.

In certain embodiments when the retention aid is the nitrogen-containing polymer of Formula II, the retention aid is independently selected from a group consisting of (i) the partially hydrolyzed poly(n-vinylformamide), with the degree of hydrolysis being from 30 to 70%, (ii) the nitrogen-containing polymer of Formula II with the molar percent of (a) being 100 mol. % with $R_x$ represented by $—R_3NH_2$, and (iii) the nitrogen-containing polymer of Formula II with the molar percent of (b) being 100 mol. %, and $R_0$ independently selected from the group consisting of H,

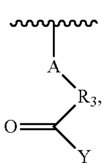

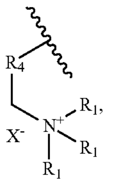

and combinations thereof.

In certain embodiments when the retention aid is the nitrogen-containing polymer of Formula II, the retention aid is independently selected from a group consisting of (i) the nitrogen-containing polymer of Formula II with the combined molar percent of (b) and (e) being 100 mol. %, and $R_0$ is independently selected from the group consisting of H,

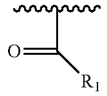

and combinations thereof, (ii) the polyallylamine having a weight average molecular weight of from 30,000 to 100,000 daltons, and (iii) the nitrogen-containing polymer of Formula II with the molar percent of (b) being 100 mol. %, and $R_0$ independently selected from the group consisting of H,

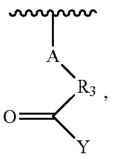

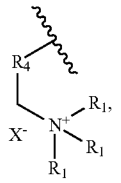

and combinations thereof.

In certain embodiments when the retention aid is the nitrogen-containing polymer of Formula II, the retention aid is independently selected from a group consisting of (i) the nitrogen-containing polymer of Formula II with the combined molar percent of (b) and (e) being 100 mol. %, and $R_0$ is independently selected from the group consisting of H,

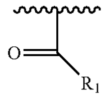

and combinations thereof, (ii) the nitrogen-containing polymer of Formula II with the molar percent of (a) being 100 mol. % with $R_x$ represented by $—R_3NH_2$, and (iii) the formamide, N-ethenyl-, homopolymer, hydrolyzed, N-(3-carboxy-1-oxopropyl) N-[2-hydroxy-3-(trimethylammonio) propyl] derivatives, chlorides (CAS Reg. No. 945630-11-5), and combinations thereof.

In certain embodiments when the retention aid is the nitrogen-containing polymer of Formula II, the molar concentration of repeating unit (a) is zero, such that Formula II is further defined by Formula III:

Formula IIIa

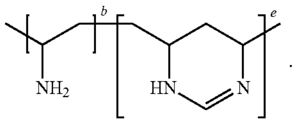

When the retention aid is the nitrogen-containing polymer of Formula III, the retention aid may be even further defined as Formula IIIa:

Formula IIIa

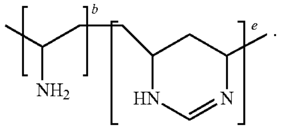

The nitrogen-containing polymer of Formula IIIa may generally be referred to as a fully hydrolyzed poly(n-vinylformamide). In other words, unlike the nitrogen-containing polymer of Formula IIa, essentially all of the functional groups capable of being hydrolyzed are in fact hydrolyzed in the nitrogen-containing polymer of Formula IIIa.

In certain embodiments when the retention aid is the nitrogen-containing polymer of Formula I, the molar percent of (c) corresponding to repeating unit (c) is 100 mol. %, such that the nitrogen-containing polymer is a polyacrylamide according to Formula IV.

Formula IV

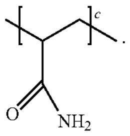

When the retention aid is a polyacrylamide, the polyacrylamide typically has a weight average molecular weight of from 5,000,000 to 6,000,000 daltons.

In different embodiments, the retention aid is a nitrogen-containing polymer selected from the group consisting of: (i) a polyethyleneimine, (ii) a polyaminoamide, (iii) a poly (diallyldimethylammonium chloride), and (iv) combinations thereof.

When the retention aid is a polyethyleneimine, the polyethyleneimine typically has a weight average molecular weight of from 40,000 to 100,000, daltons. In addition, typically from 15 to 35% of the amine groups within the polyethyleneimine are primary amines and from 35 to 65% of the amine groups within the polyethyleneimine are secondary amines, based on the total number of amine groups within the polyethyleneimine. Alternatively, 20 to 30% or about 25% of the amine groups within the polyethyleneimine are primary amines and from 45 to 55% or about 50% of the amine groups within the polyethyleneimine are secondary amines, based on the total number of amine groups within the polyethyleneimine.

The poly(diallyldimethylammonium chloride) may be a low molecular weight poly(diallyldimethylammonium chloride), a high molecular weight poly(diallyldimethylammonium chloride), or a combination thereof. In particular, the low molecular weight poly(diallyldimethylammonium chloride) has a weight average molecular weight of less than 200,000 daltons. In contrast, the high molecular weight poly(diallyldimethylammonium chloride) has a weight average molecular weight of from 300,000 to 400,000 daltons.

In each embodiment of the retention aid described above, the nitrogen-containing polymer may have a charge density of >+0.1 meq/g when the dispersion has a pH of 7. Although not required, typically the nitrogen-containing polymer has a charge density of from +5 to +13 meq/g. In addition, in each embodiment of the retention aid described above, when the nitrogen-containing polymer includes more than one repeating unit, the repeating units are typically randomly distributed within the nitrogen-containing polymer. Finally, in each embodiment of this disclosure, the dispersion is typically free of (i.e., does not include) fluorine containing polymers and fluorine containing performance additives.

The dispersion typically includes the retention aid in an amount of from 0.1 to 12 parts by weight, based on 100 parts by weight of the dispersion. Alternatively, the retention aid may be present in the dispersion in an amount of from 0.1 to 12, from 0.3 to 12, from 0.5 to 12, from 0.7 to 12, from 0.9 to 12, from 2.0 to 12, from 3.0 to 12, from 4.0 to 12, from 5.0 to 12, from 0.1 to 10, from 0.1 to 8, from 0.1 to 6, or from 0.1 to 4, parts by weight based on 100 parts by weight of the dispersion.

In certain embodiments, the dispersion includes the sizing agent selected from a group consisting of a stearate, beeswax, candelilla wax, palmitate, behenate, and combinations thereof. The dispersion also includes the nitrogen-containing polymer of Formula II:

Formula II

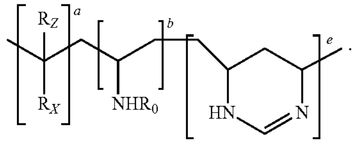

In these embodiments, the nitrogen-containing polymer has a charge density of >+0.1 meq/g when the dispersion has a pH of 7.

In other embodiments, the dispersion includes the sizing agent selected from a group consisting of a stearate, beeswax, candelilla wax, palmitate, behenate, and combinations thereof. The dispersion also includes the nitrogen-containing polymer selected from the group consisting of Formula IIa, Formula IIb, Formula IIc, and combinations thereof:

Formula IIa

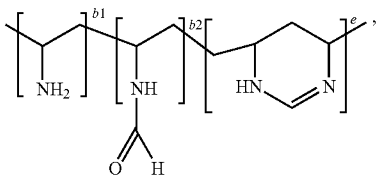

-continued

Formula IIb

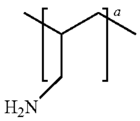

, and

Formula IIc

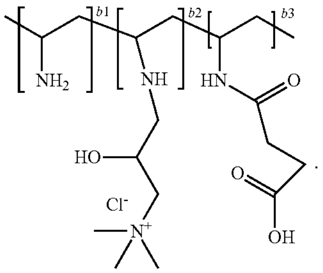

In these embodiments, the nitrogen-containing polymer has a charge density of >+0.1 meq/g when the dispersion has a pH of 7.

In certain embodiments, the dispersion includes the sizing agent selected from a group consisting of a stearate, beeswax, candelilla wax, palmitate, behenate, and combinations thereof. In different embodiments, the retention aid is a nitrogen-containing polymer selected from the group consisting of: (i) a polyethyleneimine, (ii) a polyaminoamide, (iii) a poly(diallyldimethylammonium chloride), and (iv) combinations thereof. In one embodiment, the sizing agent is behenate and the retention aid is a nitrogen-containing polymer selected from the group consisting of: (i) a polyethyleneimine, (ii) a polyaminoamide, (iii) a poly(diallyldimethylammonium chloride), and (iv) combinations thereof. In addition, the nitrogen-containing polymer has a charge density of >+0.1 meq/g when the dispersion has a pH of 7.

When the nitrogen-containing polymer is or includes the polyethyleneimine, the polyethyleneimine typically has a weight average molecular weight of from 40,000 to 100,000, daltons and 20 to 30% of the amine groups within the polyethyleneimine are primary amines and from 45 to 55% of the amine groups within the polyethyleneimine are secondary amines, based on the total number of amine groups within the polyethyleneimine. When the nitrogen-containing polymer is or includes the poly(diallyldimethylammonium chloride), the poly(diallyldimethylammonium chloride) either has a weight average molecular weight of less than 200,000 daltons or from 300,000 to 400,000 daltons.

In certain embodiments, the dispersion includes the sizing agent selected from a group consisting of a stearate, beeswax, candelilla wax, palmitate, behenate, and combinations thereof. In these embodiments, the retention aid may also include or be a polyacrylamide having a weight average molecular weight of from 5,000,000 to 6,000,000 daltons.

Although not required the dispersion may also include a surfactant for increasing the stability of the dispersion. The surfactant may be an anionic surfactant, a nonionic surfactant, a cationic surfactant, an amphoteric surfactant, or a polymeric surfactant. Among these, anionic surfactants, nonionic surfactants or cationic surfactants are typically used. When included, the surfactant is typically present in an amount of from 0.1 to 5 parts by weight, based on 100 parts by weight of the dispersion. Suitable examples of anionic surfactants include alkyl carbonate-based compounds, alkyl sulfate-based compounds and alkyl phosphates. Specific examples of anionic surfactants include dioctyl sulfosuccinate sodium salt, sodium dodecyl sulfate, and sodium lauryl sulfate. Suitable examples of nonionic surfactants include ethylene oxide and/or propylene oxide adducts of alcohols having 1 to 18 carbon atoms, ethylene oxide and/or propylene oxide adducts of alkyl phenols, and ethylene oxide and/or propylene oxide adducts of alkylene glycols and/or alkylene diamines. Suitable examples of cationic surfactants include primary to tertiary amines, pyridinium salts, alkyl pyridinium salts and quaternary ammonium salts such as quaternary alkyl halide ammonium salts.

Without being held to any particular theory, it is believed that a first portion of the amine groups of the retention aid associate with the oxygen atoms present in the ester and/or acids of the sizing agent via hydrogen or electrostatic bonding. It is further believed that the remaining portion of the amine groups bond or associate with hydroxyl groups present on the fibers, such as cellulose-based pulp fibers, also included in the treated article. In other words, the retention aid bonds or associates with to both the sizing agent and to fibers. As described further below, during the process of making the treated article, the bonding of the retention aid to both the sizing agent and the fibers fixes, retains, anchors, incorporates, orients, etc. the retention aid between and on the surface of adjacent fibers to create a dense network/matrix. It is further believed that the particular sizing agents and retention aids of this disclosure have a strong interaction, which results in an effective dispersion of the retention aid and sizing agent throughout the treated article. Treated articles prepared with the dispersion of this disclosure, in comparison to conventional treated articles prepared without the dispersion of this disclosure, have relatively less air pockets and channels within the treated article. This result is believed to be achieved because the sizing agent and retention aid effectively fills or seals these air pockets and/or channels. This decrease in the relative amount of air pockets and channels is significant and provides the treated article with enhanced barrier properties. Specifically, a treated article prepared with the dispersion of this disclosure has a relatively greater resistance to both water and oil penetration in comparison to conventional treated articles.

The present disclosure also provides a treated article formed from the dispersion. The treated article includes the retention aid, the sizing agent, and fibers. The type of fiber is not limited to any particular type, although in certain embodiments it may be advantageous to select a fiber that has the capability to bond with the amine group of the retention aid.

The treated article may be a paper product, food packaging, non-food contact packaging, wood or construction materials, nonwovens, molded fiber such as paper plates, takeout containers, bowls, etc., or any paper-like substrate, especially paper-like substrates in which water and/or oil resistance is advantageous.

The fibers may be natural fibers, synthetic fibers, semi-synthetic fibers, inorganic fibers, and combinations thereof. Specific examples of natural fibers include those derived from plant or wood matter, which may also be referred to as cellulosic fibers, such as bamboo fibers, bent grass fibers, sawgrass fibers, bagasse fibers, straw fibers, hay fibers, spruce fibers, pine fibers, fir fibers, larch fibers, eucalyptus fibers, aspen fibers, birch fibers, etc. When the natural fibers are derived from wood matter, the wood matter may be softwood and/or hardwood. Other examples of natural fibers include cotton, hemp, wool, silk, etc. Specific examples of synthetic fibers include polyamide fibers, polyester fibers, polyvinyl alcohol fibers, polyacrylonitrile fibers, polyvinyl chloride fibers, polypropylene fibers, etc. In certain embodiments, the fibers are pulp fibers from bleached and unbleached sulfate (kraft) hardwood or softwood pulps, groundwood, recycled cellulosic fibers, and bleached chemithermomechanical pulp (BCTMP), and combinations thereof.

In one embodiment, the treated article (i.e., the dried and final treated article ready for a consumer) may include fibers in an amount of from 16 to 99.8 parts by weight, the sizing agent in an amount of from 0.1 to 80 parts by weight, and the retention aid in an amount of from 0.1 to 4 parts by weight, each based on 100 parts by weight of the treated article. Alternatively, the treated article may include fibers in an amount of from 47 to 99.8 parts by weight, the sizing agent in an amount of from 1 to 50 parts by weight, and the retention aid in an amount of from 0.2 to 3 parts by weight, each based on 100 parts by weight of the treated article. Alternatively still, the treated article may include fibers in an amount of from 78 to 97.2 parts by weight, the sizing agent in an amount of from 2.5 to 20 parts by weight, and the retention aid in an amount of from 0.3 to 2 parts by weight, each based on 100 parts by weight of the treated article.

The treated article may also include components in addition to the retention aid, sizing agent and fibers. For example, the treated article may further include a starch, a resin, a crosslinking agent, a catalyst, an inorganic or organic filler, a coagulant, a supporting agent (e.g. dextrin), a holding agent, a flocculant, a buffering agent, a bactericide, a biocide, a metal ion-sealing agent, a hydrophobizing agent (e.g. alkenyl succinic anhydride and/or alkyl ketene dimer), and the like, as well as various combinations of such components.

Specific examples of starches suitable for the treated article include, but are not limited to, a hydroxyethylated starch, a cationic starch, an amphoteric starch, an oxidized starch, a phosphorylated starch, an enzyme-modified starch, and combinations thereof.

Specific examples of resins suitable for the treated article include, but are not limited to, a polyvinyl alcohol, a polyvinyl chloride latex, a polyvinyl alcohol, etc.

Specific examples of crosslinking agents suitable for treated article include, but are not limited to, a condensate or precondensate of urea or melamine-formaldehyde, methylol-dihydroxyethylene-urea or a derivative thereof, urone, methylol-ethylene-urea, methylol-propylene-urea, methylol-triazone, a dicyandiamide-formaldehyde condensate, methylol carbamate, methylol(meth)acrylamide, a polymer thereof, divinyl sulfone, polyamide or a cationic derivative thereof, a pyridinium salt of ethylene glycol chloromethyl ether, glyoxal, and combinations thereof.

Specific examples of catalysts suitable for the purposes of the treated article include, but are not limited to, ammonium chloride, an alkanolamine salt, a zirconium acetate salt, and combinations thereof.

Specific examples of inorganic fillers include, but are not limited to, silica, alumina, sericin, resin powder, talc, kaolin, precipitated calcium carbonate, ground calcium carbonate, bentonite, clays, titanium dioxide, and the like.

The particular components present in the treated article, as well as their respective amounts, may vary dependent upon the particular fibers employed in the slurry, as well as the desired end use of the treated article.

The present disclosure also provides a method for making the treated article. The method includes providing a slurry including fibers. The slurry may be provided in any suitable manner. For example, the slurry may be prepared, obtained, purchased, etc. When the step of providing the slurry comprises preparing the slurry, the slurry may be prepared in accordance with methods generally known in the art. For example, in embodiments in which the fibers are cellulosic fibers, the slurry may be prepared by mechanical pulping processes; thermomechanical pulping processes; chemithermomechanical pulping processes; chemical pulping processes, such as Kraft processes, Sulfite processes, and Soda processes; recycled pulping processes; organosolv pulping processes; etc. Alternatively, the slurry may be prepared by purchasing or otherwise obtaining dried cellulosic fibers, which are generally referred to in the art as "market pulp." In these embodiments, the market pulp is generally reconstituted into water, which is referred to as hydropulping. The fibers may be bleached, contingent upon the desired appearance of the treated article. When bleached, the fibers may be bleached with, for example, chlorine, chlorine dioxide, oxygen, ozone, hydrogen peroxide, etc.

Typically, the fibers are present in the slurry in an amount of from greater than 0 to 5, alternatively from 0.2 to 3.75, alternatively from 0.3 to 3 parts by weight based on 100 parts by weight of the slurry. Of course, it is to be appreciated that the fibers may be present in the slurry in amounts other than those set forth above contingent on the presence or absence of various optional components, as described in greater detail below. The balance of the slurry typically comprises water or a combination of water and water-miscible solvent.

In certain embodiments in which the fibers are cellulosic fibers, the fibers of the slurry are typically refined. Typically, the fibers of the slurry are refined by subjecting the slurry to shear forces, which separate cellulosic masses or fiber clusters into individual fibers. Generally, the fibers of the slurry are not refined until the slurry is prepared or provided, i.e., "market pulp" is typically not refined until it has been reconstituted into water to form the slurry.

The method further includes combining the dispersion with the slurry. In this embodiment of the method, persons having ordinary skill in the art recognize that the sizing agent may be more commonly referred to as an internal sizing agent. Once combined, the slurry and the dispersion are typically mixed to disperse the dispersion throughout the slurry.

The method further includes forming a treated article from the slurry including the dispersion. Typically, the slurry is formed into at least one sheet. For purposes of clarity, the at least one sheet is referred to herein merely as "the sheet," which is to be understood to encompass even a plurality of sheets. Methods of forming treated articles into sheet form are well known in the art. For example, the sheet is typically formed on a metal substrate, such as stainless steel, or what is referred to in the art as monofilament wire. The relative dimensions (e.g. thickness, length, width) of the sheet may vary contingent on a variety of factors, such as the desired end use of the treated article formed via the method.

Once formed, the sheet is typically dried to remove excess solvent (e.g. water and/or water-miscible solvent). The sheet may be dried via vacuum and/or foil dewatering. Alternatively, the sheet may be dried via press dewatering, in which a pressure is applied to the sheet. The pressure utilized when the sheet is dried via press dewatering is typically from 0.5 to 200 psig. Further, the sheet may be dried via contract dewatering, in which the sheet is dried via exposure to paper machine clothing, which absorbs excess water and/or the water-miscible solvent from the sheet. In addition, the sheet may be dried via contract drying, in which the sheet is in contact with metal rollers having a smooth surface. The metal rollers utilized in contract drying are typically heated, e.g. from 150 to 280° F. Any combination of these methods, or additional methods of drying the sheet to remove excess water and/or water-miscible solvent which are known in the art, may be employed. In certain embodiments, all of the methods of drying the sheet described above are employed, typically in the order in which they are introduced above.

The present disclosure also provides a method of providing a surface treated article. The method includes forming a sheet from a fiber slurry (e.g. a pulp slurry) as described above, except that the dispersion is not combined with the fiber slurry prior to the formation of the sheet. Instead, the dispersion is applied to at least one surface of the sheet after the sheet is formed. In this embodiment of the method, persons having ordinary skill in the art recognize that the sizing agent may be more commonly referred to as an external sizing agent. The dispersion may be applied to the sheet before excess water is removed from the sheet or when the sheet is considered to be dried.

The step of applying the dispersion to at least one surface of the sheet is not particularly limited so long as it is capable of creating intimate contact between the dispersion and the sheet. For example, the dispersion may be applied on at least one surface of the sheet by spraying, brushing, padding, size press coating, metering size press coating, film press coating, gravure coating, flexo coating, roller coating, rotor dampening, foaming, gate roll coating, bill blade coating, bar coating, intaglio coating, reverse roll coating, skid roll coating, transfer (offset) roll coating, knife coating, knife-over-roll coating, J-coating, air knife coating, curtain coating, and combinations thereof.

In certain embodiments, the method of forming the treated article combines both methods described above. Specifically, in this embodiment, the dispersion is added both to the slurry prior to the formation of the sheet and then subsequently applied to at least one surface of the sheet after the sheet is formed. Persons having ordinary skill in the art recognize that this method includes both an internal and external sizing step.

The disclosure further provides an additional method of making a treated article. Unlike the previous methods, this method does not form the dispersion and subsequently add the dispersion to the slurry. Instead, the retention aid and the sizing agent are separately added to the slurry without first being combined into a single composition. In other words, instead of adding a dispersion including the retention aid and the sizing agent to the slurry, the retention aid is added to the slurry without the retention aid being previously combined with the sizing agent. Similarly, the sizing agent is added to the slurry without the sizing agent being previously combined with the retention aid. The order of addition of the sizing agent and the retention aid within this embodiment is not limited. For example, the sizing agent may be added to the slurry followed by the retention aid, or vice versa. Of course, the sizing agent and the retention aid can also be simultaneously added without being previously combined with each other.

The present disclosure also provides another embodiment of the dispersion that is different than the previous embodiments. In this embodiment, the dispersion includes a reaction product of the sizing agent and the retention aid. Although not required, the reaction product may form when an amine group present on the retention aid reacts with an alkyl acid of the sizing agent. In certain embodiments, the dispersion may include the reaction product rather than separately including the sizing agent and the retention aid. Alternatively, the dispersion may include the solvent, the retention aid, the sizing agent, and further include the reaction product between the retention aid and the sizing agent. For example, the reaction product may be an amidation reaction between the amine group of the retention aid, typically a primary amine group, and the alkyl acid of the sizing agent.

In one embodiment, the reaction product is formed when the retention aid is the polyethyleneimine and the sizing agent, such as when the sizing agent includes an alkyl acid (e.g. steric acid). In this embodiment, the retention aid typically is represented by the chemical structure shown below:

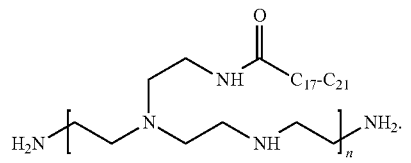

With n representing the number of repeat units.

In another embodiment, the reaction product is formed from the reaction between the sizing agent and the primary amine group of Formula IIa, Formula IIa

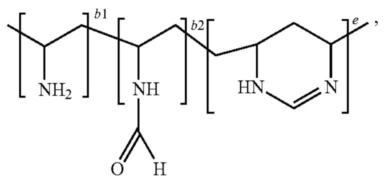

such that the reaction product is represented by Formula IIa':

Formula IIa'

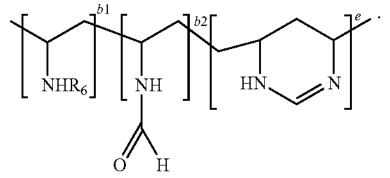

In Formula IIa', $R_6$ represents $C(=O)R_1$. Although not required, $R_1$ is typically a straight chain or branched alkyl or alkenyl containing 17 to 21 carbon atoms.

In another embodiment, the reaction product is formed from the reaction between the sizing agent and the primary amine group of Formula IIb, Formula IIb

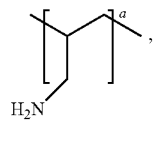

such that the reaction product is represented by Formula IIb'

Formula IIb'

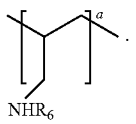

In Formula IIb', $R_6$ represents $C(=O)R_1$. Although not required, $R_1$ is typically a straight chain or branched alkyl or alkenyl containing 17 to 21 carbon atoms.

In another embodiment, the reaction product is formed from the reaction between the sizing agent and the primary amine group of Formula IIc, Formula IIc

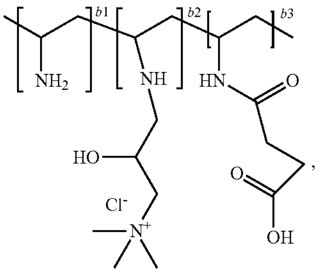

such that the reaction product is represented by Formula IIc':

Formula IIc'

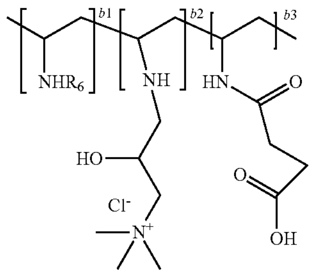

In Formula IIb', $R_6$ represents $C(=O)R_1$. Although not required, $R_1$ is typically a straight chain or branched alkyl or alkenyl containing 17 to 21 carbon atoms.

In other embodiments, the reaction product can be more generally described as the reaction product Formula I with at least one of (a), (b) or (c) including a primary amine and the alkyl acid of the sizing agent. Typically, the alkyl acid includes from 17 to 21 carbon atoms. In each instance, the primary amine reacts with the alkyl acid such that the primary amine ($NH_2$) group is replaced with $NC(=O)R_1$. Typically, $R_1$ is an alkyl chain including 17 to 21 carbon atoms.

EXAMPLES

Treated articles were prepared and evaluated by first making a dispersion and combining the dispersion with a pulp slurry. The composition of each dispersion is provided below. To prepare the pulp slurry, wood pulp was mixed in water to dilute the wood pulp to approximately 0.3 wt. % of solid pulp based on the total weight of the pulp slurry. The dispersion was then combined with the pulp slurry and further mixed. A sheet was then formed with a Noram TAPPI handsheet former and dried with an Adirondack drum dryer at 260° F. The resulting dried sheet was conditioned in a controlled humidity chamber at 23° C. and 50% relative humidity for at least 4 hours.

The dried sheets were then evaluated for water repellency at room temperature and 85° C. The dried sheets were also evaluated for corn oil repellency at room temperature. The dried sheets were also evaluated for Cobb Water Absorbency and Breakthrough Cobb Oil Testing. The results are shown below in Table I.

To evaluate the repellency, a drop of water or corn oil at the specified temperature was placed on the sheet. After 15 seconds, the sheet was evaluated to determine whether the particular liquid bled through the sheet. The results are qualitatively recorded as a pass (P) or a fail (F).

To evaluate Cobb Water Absorbency, the sheet was first weighed and clamped into a Cobb ring apparatus. Exactly 100 grams of room temperature tap water was weighed and placed on the sheet within the Cobb ring apparatus and allowed to sit for one minute and 45 seconds. Then the water was poured off and the sheet was unclamped. The sheet was then sandwiched between two sheet forming blotters and a 10 kg Cobb roller was rolled across the sheet once in a forward direction and once in a reverse direction (total of two passes, each pass in opposite directions). The sheet was then immediately weighed, and the absorbency was then calculated using the initial weight and the exposed weight.

To evaluate Breakthrough Cobb Oil Testing, the sheet was first weighed. A clean circle of Whatman #4 qualitative circles was placed under the sheet as an absorbent blotter for breakthrough. A 20 mm diameter template was then placed on the sheet to define an initial exposure area. A 0.5 gram sample of oil was then collected using a pipet and the corn oil was then added to the sheet within the 20 mm diameter template and the oil was allowed to spread across the sheet until it was evenly spread across the template. After the oil was delivered to the sheet, the pipet was weighed to determine the exact mass of oil added to the sheet. Once the oil was evenly spread, the template was removed and a 300 gram weight was centered and placed on top of the oil and allowed to sit for 120 seconds. A sheet forming blotter was then placed on top of the sheet and a 10 kg Cobb roller was rolled across the sheet once in a forward direction and once in a reverse direction (total of two passes, each pass in opposite directions) to absorb excess oil on the surface of the sheet. The exposed sheet and Whatman #4 qualitative circle were then weighed and the % absorbance was calculated.

509-2

| Component | Dispersion | Wt. % in dispersion | Wt. % based on dried pulp |
|---|---|---|---|
| Solvent 1 | Tap water | 88.03 | 0 |
| Wax | Synthetic Beeswax (acid value 22.8) | 6.16 | 4.79 |
| Solvent 2 | Dipropylene glycol | 2.32 | 1.8 |
| Surfactant | Surfynol 465 | 0.95 | 0.74 |
| Retention Aid | partially hydrolyzed poly(n-vinylformamide) | 2.54 | 0.24 |

509-5

| Component | Dispersion | Wt. % in dispersion | Wt. % based on dried pulp |
|---|---|---|---|
| Solvent 1 | Tap water | 79.33 | 0 |
| Wax | Synthetic Beeswax (acid value 22.8) | 10.93 | 4.77 |
| Solvent 2 | Propylene glycol | 4.13 | 1.8 |
| Surfactant 1 | Span 60 | 0.53 | 0.23 |
| Surfactant 2 | Tween 60 | 0.53 | 0.23 |
| Additive 1 | Ammonium Hydroxide | 0.05 | 0.023 |
| Retention Aid | partially hydrolyzed poly(n-vinylformamide) | 4.50 | 0.24 |

509-7

| Component | Dispersion | Wt. % in dispersion | Wt. % based on dried pulp |
|---|---|---|---|
| Solvent 1 | Tap water | 86.87 | 0 |
| Wax | Stearic Acid (acid value 208.9) | 6.76 | 4.62 |
| Solvent 2 | Propylene glycol | 2.55 | 1.74 |
| Surfactant | Surfynol 465 | 1.05 | 0.71 |
| Retention Aid | partially hydrolyzed poly(n-vinylformamide) | 2.78 | 0.23 |

617-1

| Component | Dispersion | Wt. % in dispersion | Wt. % based on dried pulp |
|---|---|---|---|
| Solvent 1 | Tap water | 68.00 | 0 |
| Wax | Stearic Acid (acid value 208.9) | 14.55 | 4.55 |
| Solvent 2 | Propylene glycol | 5.33 | 1.9 |
| Retention Aid | partially hydrolyzed poly(n-vinylformamide) | 12.12 | 0.45 |

617-2

| Component | Dispersion | Wt. % in dispersion | Wt. % based on dried pulp |
|---|---|---|---|
| Solvent 1 | Tap water | 69.64 | 0 |
| Wax | Stearic Acid (acid value 208.9) | 14.77 | 4.62 |
| Solvent 2 | Propylene glycol | 5.33 | 1.9 |
| Retention Aid | partially hydrolyzed poly(n-vinylformamide) | 10.26 | 0.38 |

617-3

| Component | Dispersion | Wt. % in dispersion | Wt. % based on dried pulp |
|---|---|---|---|
| Solvent 1 | Tap water | 71.76 | 0 |
| Wax | Stearic Acid (acid value 208.9) | 15.06 | 4.71 |
| Solvent 2 | Propylene glycol | 5.33 | 1.9 |
| Retention Aid | partially hydrolyzed poly(n-vinylformamide) | 7.84 | 0.29 |

617-4

| Component | Dispersion | Wt. % in dispersion | Wt. % based on dried pulp |
|---|---|---|---|
| Solvent 1 | Tap water | 73.08 | 0 |
| Wax | Stearic Acid (acid value 208.9) | 15.24 | 4.76 |
| Solvent 2 | Propylene glycol | 5.33 | 1.9 |
| Retention Aid | partially hydrolyzed poly(n-vinylformamide) | 6.35 | 0.24 |

617-5

| Component | Dispersion | Wt. % in dispersion | Wt. % based on dried pulp |
|---|---|---|---|
| Solvent 1 | Tap water | 67.11 | 0 |
| Wax | Stearic Acid (acid value 208.9) | 14.55 | 4.55 |
| Solvent 2 | Propylene glycol | 5.33 | 1.9 |
| Additive 1 | Acetic acid | 0.89 | 0.31 |
| Retention Aid | partially hydrolyzed poly(n-vinylformamide) | 12.12 | 0.45 |

617-6

| Component | Dispersion | Wt. % in dispersion | Wt. % based on dried pulp |
|---|---|---|---|
| Solvent 1 | Tap water | 68.75 | 0 |
| Wax | Stearic Acid (acid value 208.9) | 14.77 | 4.62 |
| Solvent 2 | Propylene glycol | 5.33 | 1.9 |
| Additive 1 | Acetic acid | 0.89 | 0.31 |
| Retention Aid | partially hydrolyzed poly(n-vinylformamide) | 10.26 | 0.38 |

| 617-7 | | | |
|---|---|---|---|
| Component | Dispersion | Wt. % in dispersion | Wt. % based on dried pulp |
| Solvent 1 | Tap water | 70.88 | 0 |
| Wax | Stearic Acid (acid value 208.9) | 15.06 | 4.71 |
| Solvent 2 | Propylene glycol | 5.33 | 1.9 |
| Additive 1 | Acetic acid | 0.89 | 0.31 |
| Retention Aid | partially hydrolyzed poly(n-vinylformamide) | 7.84 | 0.29 |

| 617-8 | | | |
|---|---|---|---|
| Component | Dispersion | Wt. % in dispersion | Wt. % based on dried pulp |
| Solvent 1 | Tap water | 72.19 | 0 |
| Wax | Stearic Acid (acid value 208.9) | 15.24 | 4.76 |
| Solvent 2 | Propylene glycol | 5.33 | 1.9 |
| Additive 1 | Acetic acid | 0.89 | 0.31 |
| Retention Aid | partially hydrolyzed poly(n-vinylformamide) | 6.35 | 0.24 |

| 719-1 | | | |
|---|---|---|---|
| Component | Dispersion | Wt. % in dispersion | Wt. % based on dried pulp |
| Solvent 1 | Tap water | 72.40 | 0 |
| Wax | Stearic Acid (acid value 208.9) | 15.24 | 4.76 |
| Solvent 2 | Propylene glycol | 6.02 | 1.9 |
| Retention Aid | partially hydrolyzed poly(n-vinylformamide) | 6.35 | 0.24 |

| 719-2 | | | |
|---|---|---|---|
| Component | Dispersion | Wt. % in dispersion | Wt. % based on dried pulp |
| Solvent 1 | Tap water | 72.93 | 0 |
| Wax | 90% $C_{18}$ Stearic Acid (acid value 198) | 15.28 | 4.77 |
| Solvent 2 | Propylene glycol | 5.74 | 1.8 |
| Retention Aid | partially hydrolyzed poly(n-vinylformamide) | 6.05 | 0.23 |

| 719-3 | | | |
|---|---|---|---|
| Component | Dispersion | Wt. % in dispersion | Wt. % based on dried pulp |
| Solvent 1 | Tap water | 73.46 | 0 |
| Wax | Behenic Acid (acid value 161-169) | 15.32 | 4.79 |

-continued

| 719-3 | | | |
|---|---|---|---|
| Component | Dispersion | Wt. % in dispersion | Wt. % based on dried pulp |
| Solvent 2 | Propylene glycol | 5.46 | 1.7 |
| Retention Aid | partially hydrolyzed poly(n-vinylformamide) | 5.76 | 0.22 |

| 719-4 | | | |
|---|---|---|---|
| Component | Dispersion | Wt. % in dispersion | Wt. % based on dried pulp |
| Solvent 1 | Tap water | 74.75 | 0 |
| Wax | Kester FA-3 (acid value 160.9) | 15.43 | 4.82 |
| Solvent 2 | Propylene glycol | 4.78 | 1.5 |
| Retention Aid | partially hydrolyzed poly(n-vinylformamide) | 5.04 | 0.19 |

| 720-1 | | | |
|---|---|---|---|
| Component | Dispersion | Wt. % in dispersion | Wt. % based on dried pulp |
| Solvent 1 | Tap water | 72.40 | 0 |
| Wax | Stearic Acid (acid value 208.9) | 15.24 | 4.76 |
| Solvent 2 | Propylene glycol | 6.02 | 1.9 |
| Retention Aid | partially hydrolyzed poly(n-vinylformamide) | 6.35 | 0.37 |

| 720-2 | | | |
|---|---|---|---|
| Component | Dispersion | Wt. % in dispersion | Wt. % based on dried pulp |
| Solvent 1 | Tap water | 72.93 | 0 |
| Wax | 90% $C_{18}$ Stearic Acid (acid value 198) | 15.28 | 4.77 |
| Solvent 2 | Propylene glycol | 5.74 | 1.8 |
| Retention Aid | partially hydrolyzed poly(n-vinylformamide) | 6.05 | 0.37 |

| 720-3 | | | |
|---|---|---|---|
| Component | Dispersion | Wt. % in dispersion | Wt. % based on dried pulp |
| Solvent 1 | Tap water | 73.46 | 0 |
| Wax | Behenic Acid (acid value 161-169) | 15.32 | 4.79 |
| Solvent 2 | Propylene glycol | 5.46 | 1.7 |
| Retention Aid | partially hydrolyzed poly(n-vinylformamide) | 5.76 | 0.37 |

| 720-4 | | | |
|---|---|---|---|
| Component | Dispersion | Wt. % in dispersion | Wt. % based on dried pulp |
| Solvent 1 | Tap water | 74.75 | 0 |
| Wax | Kester FA-3 (acid value 160.9) | 15.43 | 4.82 |
| Solvent 2 | Propylene glycol | 4.78 | 1.5 |
| Retention Aid | partially hydrolyzed poly(n-vinylformamide) | 5.04 | 0.37 |

| 720-5 | | | |
|---|---|---|---|
| Component | Dispersion | Wt. % in dispersion | Wt. % based on dried pulp |
| Solvent 1 | Tap water | 72.40 | 0 |
| Wax | Stearic Acid (acid value 208.9) | 15.24 | 2.38 |
| Solvent 2 | Propylene glycol | 6.02 | 0.94 |
| Retention Aid | partially hydrolyzed poly(n-vinylformamide) | 6.35 | 0.37 |

| 720-6 | | | |
|---|---|---|---|
| Component | Dispersion | Wt. % in dispersion | Wt. % based on dried pulp |
| Solvent 1 | Tap water | 72.93 | 0 |
| Wax | 90% $C_{18}$ Stearic Acid (acid value 198) | 15.28 | 2.39 |
| Solvent 2 | Propylene glycol | 5.74 | 0.9 |
| Retention Aid | partially hydrolyzed poly(n-vinylformamide) | 6.05 | 0.37 |

| 720-7 | | | |
|---|---|---|---|
| Component | Dispersion | Wt. % in dispersion | Wt. % based on dried pulp |
| Solvent 1 | Tap water | 73.46 | 0 |
| Wax | Behenic Acid (acid value 161-169) | 15.32 | 2.40 |
| Solvent 2 | Propylene glycol | 5.46 | 0.86 |
| Retention Aid | partially hydrolyzed poly(n-vinylformamide) | 5.76 | 0.37 |

| 720-8 | | | |
|---|---|---|---|
| Component | Dispersion | Wt. % in dispersion | Wt. % based on dried pulp |
| Solvent 1 | Tap water | 74.75 | 0 |
| Wax | Kester FA-3 (acid value 160.9) | 15.43 | 2.41 |
| Solvent 2 | Propylene glycol | 4.78 | 0.75 |
| Retention Aid | partially hydrolyzed poly(n-vinylformamide) | 5.04 | 0.37 |

| 720-9 | | | |
|---|---|---|---|
| Component | Dispersion | Wt. % in dispersion | Wt. % based on dried pulp |
| Solvent 1 | Tap water | 72.40 | 0 |
| Wax | Stearic Acid (acid value 208.9) | 15.24 | 9.52 |
| Solvent 2 | Propylene glycol | 6.02 | 3.76 |
| Retention Aid | partially hydrolyzed poly(n-vinylformamide) | 6.35 | 0.48 |

| 720-10 | | | |
|---|---|---|---|
| Component | Dispersion | Wt. % in dispersion | Wt. % based on dried pulp |
| Solvent 1 | Tap water | 72.93 | 0 |
| Wax | 90% $C_{18}$ Stearic Acid (acid value 198) | 15.28 | 9.54 |
| Solvent 2 | Propylene glycol | 5.74 | 3.58 |
| Retention Aid | partially hydrolyzed poly(n-vinylformamide) | 6.05 | 0.45 |

| 720-11 | | | |
|---|---|---|---|
| Component | Dispersion | Wt. % in dispersion | Wt. % based on dried pulp |
| Solvent 1 | Tap water | 73.46 | 0 |
| Wax | Behenic Acid (acid value 161-169) | 15.32 | 9.58 |
| Solvent 2 | Propylene glycol | 5.46 | 3.42 |
| Retention Aid | partially hydrolyzed poly(n-vinylformamide) | 5.76 | 0.43 |

| 720-12 | | | |
|---|---|---|---|
| Component | Dispersion | Wt. % in dispersion | Wt. % based on dried pulp |
| Solvent 1 | Tap water | 74.75 | 0 |
| Wax | Kester FA-3 (acid value 160.9) | 15.43 | 9.64 |
| Solvent 2 | Propylene glycol | 4.78 | 2.98 |
| Retention Aid | partially hydrolyzed poly(n-vinylformamide) | 5.04 | 0.38 |

| 910-1 | | | |
|---|---|---|---|
| Component | Dispersion | Wt. % in dispersion | Wt. % based on dried pulp |
| Solvent 1 | Tap water | 72.40 | 0 |
| Wax | 90% $C_{18}$ Stearic Acid (acid value 198) | 15.24 | 4.62 |
| Solvent 2 | Propylene glycol | 6.02 | 1.67 |
| Retention Aid | partially hydrolyzed poly(n-vinylformamide) | 6.35 | 0.38 |

| 910-2 | | | |
|---|---|---|---|
| Component | Dispersion | Wt. % in dispersion | Wt. % based on dried pulp |
| Solvent 1 | Tap water | 72.93 | 0 |
| Wax | Lauric Acid (acid value 278-282) | 15.28 | 4.62 |
| Solvent 2 | Propylene glycol | 5.74 | 1.67 |
| Retention Aid | partially hydrolyzed poly(n-vinylformamide) | 6.05 | 0.38 |

| 910-3 | | | |
|---|---|---|---|
| Component | Dispersion | Wt. % in dispersion | Wt. % based on dried pulp |
| Solvent 1 | Tap water | 73.46 | 0 |
| Wax | Oleic Acid (acid value 198.6) | 15.32 | 4.62 |
| Solvent 2 | Propylene glycol | 5.46 | 1.67 |
| Retention Aid | partially hydrolyzed poly(n-vinylformamide) | 5.76 | 0.38 |

| 910-4 | | | |
|---|---|---|---|
| Component | Dispersion | Wt. % in dispersion | Wt. % based on dried pulp |
| Solvent 1 | Tap water | 74.75 | 0 |
| Wax | Lauric Acid (acid value 278-282) | 15.43 | 4.47 |
| Solvent 2 | Propylene glycol | 4.78 | 2.3 |
| Retention Aid | partially hydrolyzed poly(n-vinylformamide) | 5.04 | 0.53 |

TABLE I

| Sheet formed from: | Water drop repel 15 sec, room temp | Hot water drop repel (85° C.) 15 sec | RT corn oil drop repel 15 sec | % sheet oil gain | % filter oil gain | Oil Bleed through |
|---|---|---|---|---|---|---|
| 509-2 | P | P | P | — | — | — |
| 509-5 | P | P | P | — | — | — |
| 509-7 | P | P | P | — | — | — |
| 617-1 | P | P | P | 5.62 | 0.00 | No |
| 617-2 | P | P | P | 5.68 | 0.00 | No |
| 617-3 | P | P | P | 6.56 | 0.00 | No |
| 617-4 | P | P | P | 6.18 | 0.00 | No |
| 617-5 | P | P | P | 6.30 | 1.99 | Yes |
| 617-6 | P | P | P | 5.57 | 1.47 | Yes |
| 617-7 | P | P | P | 6.76 | 0.78 | Yes |
| 617-8 | P | P | P | 6.48 | 1.38 | Yes |
| 719-1 | P | P | P | — | — | — |
| 719-2 | P | P | P | — | — | — |
| 719-3 | P | P | P | — | — | — |
| 719-4 | P | P | P | — | — | — |
| 720-1 | p | P | P | — | — | — |
| 720-2 | p | P | P | — | — | — |
| 720-3 | p | P | P | — | — | — |
| 720-4 | p | P | P | — | — | — |
| 720-5 | p | P | P | — | — | — |
| 720-6 | p | P | P | — | — | — |
| 720-7 | p | P | P | — | — | — |
| 720-8 | p | P | P | — | — | — |

TABLE I-continued

| Sheet formed from: | Water drop repel 15 sec, room temp | Hot water drop repel (85° C.) 15 sec | RT corn oil drop repel 15 sec | % sheet oil gain | % filter oil gain | Oil Bleed through |
|---|---|---|---|---|---|---|
| 720-9 | p | P | P | — | — | — |
| 720-10 | p | P | P | — | — | — |
| 720-11 | p | P | P | — | — | — |
| 720-12 | p | P | P | — | — | — |
| 910-1 | P | P | p | 11.15 | 0.44 | Slight |
| 910-2 | P | F | F | 19.98 | 7.27 | Yes |
| 910-3 | P | F | F | 16.75 | 4.36 | Yes |
| 910-4 | P | F | F | 18.32 | 6.29 | Yes |

Additional treated articles were prepared and evaluated using the following method. A pulp slurry was made from wood pulp by mixing wood pulp in water to dilute the wood pulp to approximately 0.3 wt. % of solid pulp based on the total weight of the pulp slurry. A diluted solution of retention aid was then combined with the slurry and stirred for 60 seconds. A wax dispersion was then added to the slurry and mixed for an additional minute. A sheet was then formed with a Noram TAPPI handsheet former and dried with an Adirondack drum dryer at 260° F. The resulting dried sheet was conditioned in a controlled humidity chamber at 23° C. and 50% relative humidity for at least 4 hours. The composition of the wax dispersion and retention aid is described below. Testing performed on the resulting sheets is reported in Table II below.

| 218-1 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.37 |

| 218-2 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | none | — | 0 |

| 218-3 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 1 |

| 218-4 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 1.5 |

| 218-5 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | fully hydrolyzed poly(n-vinylformamide) | — | 0.371 |

| 218-6 | | | |
|---|---|---|---|
| Component | Dispersion | Wt. % in dispersion | Wt. % based on dried pulp |
| Solvent 1 | Tap water | 65.14 | 0 |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | polydimethylamine-epichlorohydrin | — | 0.37 |

| 218-7 | | | |
|---|---|---|---|
| Component | Dispersion | Wt. % in dispersion | Wt. % based on dried pulp |
| Solvent 1 | Tap water | 0.00 | 0 |
| Wax | Synthetic Beeswax (acid value 22.8) | 0.00 | 0 |
| Solvent 2 | Dipropylene glycol | 0.00 | 0.00 |
| Surfactant | Sodium Lauryl Sulfate | 0.00 | 0.00 |
| Retention Aid | partially hydrolyzed poly(n-vinylformamide) | — | 0.371 |

| 218-8 | | | |
|---|---|---|---|
| Component | Dispersion | Wt. % in dispersion | Wt. % based on dried pulp |
| Solvent 1 | Tap water | 0.00 | 0 |
| Wax | Synthetic Beeswax (acid value 22.8) | 0.00 | 0 |
| Solvent 2 | Dipropylene glycol | 0.00 | 0.00 |
| Surfactant | Sodium Lauryl Sulfate | 0.47 | 0.09 |
| Retention Aid | partially hydrolyzed poly(n-vinylformamide) | — | 0.371 |

| 218-9 | | | |
|---|---|---|---|
| Component | Dispersion | Wt. % in dispersion | Wt. % based on dried pulp |
| Solvent 1 | Tap water | 0.00 | 0 |
| Synthetic Wax | Beeswax (acid value 22.8) | 0.00 | 0 |
| Solvent 2 | Dipropylene glycol | 0.00 | 0.00 |
| Surfactant | Sodium Lauryl Sulfate | 1.08 | 0.22 |
| Retention Aid | partially hydrolyzed poly(n-vinylformamide) | — | 0.371 |

| 221-1 | | | |
|---|---|---|---|
| Component | Dispersion | Wt. % in dispersion | Wt. % based on dried pulp |
| Solvent 1 | Tap water | 59.19 | 0 |
| Wax | Synthetic Beeswax (acid value 22.8) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-2 | | | |
|---|---|---|---|
| Component | Dispersion | Wt. % in dispersion | Wt. % based on dried pulp |
| Solvent 1 | Tap water | 59.19 | 0 |
| Wax | Rice bran wax (acid value 1.4) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-3 | | | |
|---|---|---|---|
| Component | Dispersion | Wt. % in dispersion | Wt. % based on dried pulp |
| Solvent 1 | Tap water | 59.19 | 0 |
| Wax | Carnauba T-3 wax (acid value 8.9) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-4 | | | |
|---|---|---|---|
| Component | Dispersion | Wt. % in dispersion | Wt. % based on dried pulp |
| Solvent 1 | Tap water | 59.19 | 0 |
| Wax | #1 Yellow Carnauba Wax NF (acid value 5.3) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-5 | | | |
|---|---|---|---|
| Component | Dispersion | Wt. % in dispersion | Wt. % based on dried pulp |
| Solvent 1 | Tap water | 59.19 | 0 |
| Wax | Candelilla wax (acid value 18.7) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-7 | | | |
|---|---|---|---|
| Component | Dispersion | Wt. % in dispersion | Wt. % based on dried pulp |
| Solvent 1 | Tap water | 59.19 | 0 |
| Wax | Paraffin 140/145 wax (acid value < 1) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-8 | | | |
|---|---|---|---|
| Component | Dispersion | Wt. % in dispersion | Wt. % based on dried pulp |
| Solvent 1 | Tap water | 59.19 | 0 |
| Wax | Paraffin 150/155 wax (acid value < 1) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-9 | | | |
|---|---|---|---|
| Component | Dispersion | Wt. % in dispersion | Wt. % based on dried pulp |
| Solvent 1 | Tap water | 59.19 | 0 |
| Wax | White Beeswax (acid value 18.9) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 221-11 | | | |
|---|---|---|---|
| Component | Dispersion | Wt. % in dispersion | Wt. % based on dried pulp |
| Solvent 1 | Tap water | 56.59 | 0 |
| Wax | Synthetic Beeswax (acid value 22.8) | 23.15 | 5 |
| Solvent 2 | Dipropylene glycol | 18.67 | 3.7 |
| Surfactant | Dioctyl sulfosuccinate sodium salt | 1.59 | 0.3 |
| Retention Aid | partially hydrolyzed poly(n-vinylformamide) | — | 0.371 |

| 227-1 | | | |
| --- | --- | --- | --- |
| Component | Dispersion | Wt. % in dispersion | Wt. % based on dried pulp |
| Solvent 1 | Tap water | 65.14 | 0 |
| Wax | Synthetic beeswax (acid value 22.8) | 25.00 | 7.5 |
| Solvent 2 | Dipropylene glycol | 9.39 | 2.82 |
| Surfactant | Sodium Lauryl Sulfate | 0.47 | 0.14 |
| Retention Aid | partially hydrolyzed poly(n-vinylformamide) | — | 0.371 |

| 227-2 | | | |
| --- | --- | --- | --- |
| Component | Dispersion | Wt. % in dispersion | Wt. % based on dried pulp |
| Solvent 1 | Tap water | 65.14 | 0 |
| Wax | Synthetic beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | polyacrylamide (Mw 5,000,000-6,000,000) | — | 0.371 |

| 227-3 | | | |
| --- | --- | --- | --- |
| Component | Dispersion | Wt. % in dispersion | Wt. % based on dried pulp |
| Solvent 1 | Tap water | 65.14 | 0 |
| Wax | Synthetic beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | polyallylamine (Mw ~65,000) | — | 0.371 |

| 318-1 | | | |
| --- | --- | --- | --- |
| Component | Dispersion | Wt. % in dispersion | Wt. % based on dried pulp |
| Solvent 1 | Tap water | 59.19 | 0 |
| Wax | White Beeswax (acid value 18.9) | 23.15 | 5 |
| Solvent 2 | Dipropylene glycol | 16.67 | 3.3 |
| Surfactant | Sodium Lauryl Sulfate | 0.99 | 0.2 |
| Retention Aid | partially hydrolyzed poly(n-vinylformamide) | — | 0.371 |

| 318-2 | | | |
| --- | --- | --- | --- |
| Component | Dispersion | Wt. % in dispersion | Wt. % based on dried pulp |
| Solvent 1 | Tap water | 65.14 | — |
| Wax | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | fully hydrolyzed poly(n-vinylformamide) | — | 0.371 |

| 318-3 | | | |
| --- | --- | --- | --- |
| Component | Dispersion | Wt. % in dispersion | Wt. % based on dried pulp |
| Solvent 1 | Tap water | 65.14 | 0 |
| Wax | Synthetic beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | polyacrylamide (Mw 5,000,000-6,000,000) | — | 5.83 |

| 318-4 | | | |
| --- | --- | --- | --- |
| Component | Dispersion | Wt. % in dispersion | Wt. % based on dried pulp |
| Solvent 1 | Tap water | 65.14 | 0 |
| Wax | Synthetic beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | Polyethyleneimine (Mw 70,000) | — | 0.074 |

| W0410-1 | | | |
| --- | --- | --- | --- |
| Component | Dispersion | Wt. % in dispersion | Wt. % based on dried pulp |
| Solvent 1 | Tap water | 65.14 | 0 |
| Wax 1 | Paraffin 150/155 (acid value < 1) | 15.00 | 3 |
| Wax 2 | C20-40 Alkyl Stearate (acid value < 1) | 7.50 | 1.5 |
| Wax 3 | FA-3 > C14 fatty acids (acid value 160.9) | 2.50 | 0.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0410-2

| Component | Dispersion | Wt. % in dispersion | Wt. % based on dried pulp |
|---|---|---|---|
| Solvent 1 | Tap water | 65.14 | 0 |
| Wax 1 | Paraffin 150/155 (acid value < 1) | 15.00 | 3 |
| Wax 2 | C20-40 Alkyl Stearate (acid value < 1) | 7.50 | 0.5 |
| Wax 3 | FA-3 > C14 fatty acids (acid value 160.9) | 2.50 | 1.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0410-3

| Component | Dispersion | Wt. % in dispersion | Wt. % based on dried pulp |
|---|---|---|---|
| Solvent 1 | Tap water | 65.14 | 0 |
| Wax 1 | Paraffin 150/155 (acid value <1) | 7.5 | 1.5 |
| Wax 2 | C20-40 Alkyl Stearate (acid value <1) | 15 | 3 |
| Wax 3 | FA-3 >C14 fatty acids (acid value 160.9) | 2.5 | 0.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0410-5

| Component | Dispersion | Wt. % in dispersion | Wt. % based on dried pulp |
|---|---|---|---|
| Solvent 1 | Tap water | 65.14 | 0 |
| Wax 1 | Paraffin 150/155 (acid value <1) | 2.5 | 0.5 |
| Wax 2 | C20-40 Alkyl Stearate (acid value <1) | 15 | 3 |
| Wax 3 | FA-3 >C14 fatty acids (acid value 160.9) | 7.5 | 1.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

330-2

| Component | Dispersion | Wt. % in dispersion | Wt. % based on dried pulp |
|---|---|---|---|
| Solvent 1 | Tap water | 65.14 | 0 |
| Wax 1 | Acid-free Candelilla (acid value 0) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W10515-1

| Component | Dispersion | Wt. % in dispersion | Wt. % based on dried pulp |
|---|---|---|---|
| Solvent 1 | Tap water | 65.14 | 0 |
| Wax 1 | SB Blend LM (acid value 17.7) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-2

| Component | Dispersion | Wt. % in dispersion | Wt. % based on dried pulp |
|---|---|---|---|
| Solvent 1 | Tap water | 65.14 | 0 |
| Wax 1 | SB Blend MM (acid value 18.1) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-3

| Component | Dispersion | Wt. % in dispersion | Wt. % based on dried pulp |
|---|---|---|---|
| Solvent 1 | Tap water | 65.14 | 0 |
| Wax 1 | SB Blend HM (acid value 18.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-4

| Component | Dispersion | Wt. % in dispersion | Wt. % based on dried pulp |
|---|---|---|---|
| Solvent 1 | Tap water | 65.14 | 0 |
| Wax 1 | SB High acid Blend (acid value 31.5) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W10515-5

| Component | Dispersion | Wt. % in dispersion | Wt. % based on dried pulp |
|---|---|---|---|
| Solvent 1 | Tap water | 65.14 | 0 |
| Wax 1 | SB High acid Blend LM (acid value 29.3) | 25.00 | 5 |

-continued

W10515-5

| Component | Dispersion | Wt. % in dispersion | Wt. % based on dried pulp |
|---|---|---|---|
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-6

| Component | Dispersion | Wt. % in dispersion | Wt. % based on dried pulp |
|---|---|---|---|
| Solvent 1 | Tap water | 65.14 | 0 |
| Wax 1 | SB High acid Blend MM (acid value 29.7) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-7

| Component | Dispersion | Wt. % in dispersion | Wt. % based on dried pulp |
|---|---|---|---|
| Solvent 1 | Tap water | 65.14 | 0 |
| Wax 1 | SB High acid Blend HM (acid value 29.9) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-8

| Component | Dispersion | Wt. % in dispersion | Wt. % based on dried pulp |
|---|---|---|---|
| Solvent 1 | Tap water | 65.14 | 0 |
| Wax 1 | Synthetic Beeswax (acid value 22.8) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-9

| Component | Dispersion | Wt. % in dispersion | Wt. % based on dried pulp |
|---|---|---|---|
| Solvent 1 | Tap water | 65.14 | 0 |
| Wax 1 | Stearic acid (acid value 208.9) | 25.00 | 5 |

-continued

W0515-9

| Component | Dispersion | Wt. % in dispersion | Wt. % based on dried pulp |
|---|---|---|---|
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-10

| Component | Dispersion | Wt. % in dispersion | Wt. % based on dried pulp |
|---|---|---|---|
| Solvent 1 | Tap water | 65.14 | 0 |
| Wax 1 | Synthetic Beeswax (acid value 22.8) | 12.50 | 2.5 |
| Wax 2 | Stearic acid (acid value 208.9) | 12.50 | 2.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.371 |

W0515-11

| Component | Dispersion | Wt. % in dispersion | Wt. % based on dried pulp |
|---|---|---|---|
| Solvent 1 | Tap water | 65.14 | 0 |
| Wax 1 | Stearic acid (acid value 208.9) | 25.00 | 5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.742 |

W0515-12

| Component | Dispersion | Wt. % in dispersion | Wt. % based on dried pulp |
|---|---|---|---|
| Solvent 1 | Tap water | 65.14 | 0 |
| Wax 1 | Synthetic Beeswax (acid value 22.8) | 12.50 | 2.5 |
| Wax 2 | Stearic acid (acid value 208.9) | 12.50 | 2.5 |
| Solvent 2 | Dipropylene glycol | 9.39 | 1.9 |
| Surfactant | Sodium Lauryl Sulfate | 0.47 | 0.09 |
| Retention Aid | partially hydrolyzed poly(n-vinylformamide) | — | 0.742 |

TABLE II

| Sheet formed from: | Water drop repel 15 sec, room temp | Hot water drop repel (85° C.) 15 sec | RT corn oil drop repel 15 sec | Water Cobb value gsm | Water Cobb % | % sheet oil gain | % filter oil gain | Oil Bleed through |
|---|---|---|---|---|---|---|---|---|
| 218-1 | P | P | P | 15.40 | 6.67 | 6.44 | 0.00 | No |
| 218-2 | P | F | F | 27.30 | 12.19 | 12.93 | 0.00 | No |
| 218-3 | P | P | F | 18.50 | 7.97 | 9.11 | 0.00 | No |
| 218-4 | P | P | F | 21.00 | 9.17 | 14.53 | 0.61 | Slight |
| 218-5 | P | F | P | 20.80 | 8.71 | 5.99 | 0.00 | No |
| 218-6 | P | F | P | 19.10 | 8.26 | 4.05 | 0.00 | No |
| 218-7 | F | F | F | 205.30 | 86.26 | 10.64 | 0.80 | Slight |
| 218-8 | F | F | F | 185.50 | 82.48 | 11.23 | 0.52 | Slight |
| 218-9 | F | F | F | 187.00 | 82.09 | 13.22 | 1.06 | Slight |
| 221-1 | P | P | P | 13.90 | 5.21 | 4.88 | 0.00 | No |
| 221-2 | P | P | F | 21.30 | 8.60 | 18.90 | 3.14 | Yes |
| 221-3 | P | P | F | 19.40 | 8.24 | 14.83 | 2.93 | Yes |
| 221-4 | P | P | F | 20.60 | 8.60 | 19.08 | 2.88 | Yes |
| 221-5 | P | P | P | 13.70 | 5.75 | 4.33 | 0.00 | No |
| 221-7 | P | F | F | 22.70 | 9.14 | 17.36 | 0.26 | Slight |
| 221-8 | P | F | F | 21.20 | 8.75 | 15.00 | 1.75 | Yes |
| 221-9 | P | P | F | 16.20 | 7.31 | 17.48 | 1.30 | Slight |
| 221-11 | P | P | F | 20.10 | 8.35 | 9.75 | 0.00 | No |
| 227-1 | P | P | P | 14.50 | 5.59 | 3.93 | 0.00 | No |
| 227-2 | P | F | P | 24.00 | 9.86 | 8.27 | 0.00 | No |
| 227-3 | P | P | P | 14.00 | 5.25 | 5.80 | 0.00 | No |
| 318-1 | P | P | P | 18.70 | 7.88 | 13.50 | 0.00 | No |
| 318-2 | P | F | P | 17.60 | 6.60 | 5.35 | 0.00 | No |
| 318-3 | P | F | F | 44.20 | 18.73 | 18.73 | 0.09 | Slight |
| 318-4 | P | F | F | 28.00 | 13.16 | 15.78 | 0.00 | No |
| W0410-1 | P | P | P | 12.30 | 5.69 | 12.95 | 0.98 | Yes |
| W0410-2 | P | P | P | 15.20 | 7.93 | 9.30 | 0.00 | No |
| W0410-3 | P | P | P | 15.50 | 8.49 | 13.22 | 1.66 | Yes |
| W0410-5 | P | P | P | 15.00 | 6.73 | 7.02 | 0.00 | No |
| 0330-2 | P | F | F | 13.80 | 6.61 | 17.76 | 5.87 | Yes |
| W0515-1 | P | P | P | 41.20 | 11.52 | 9.99 | 0.00 | No |
| W0515-2 | P | P | P | 47.50 | 12.95 | 7.28 | 0.70 | Slight |
| W0515-3 | P | P | P | 38.30 | 12.77 | 8.96 | 0.35 | Slight |
| W0515-4 | P | P | P | 36.90 | 11.92 | 11.73 | 0.26 | Slight |
| W0515-5 | P | P | P | 38.80 | 11.92 | 8.46 | 0.00 | No |
| W0515-6 | P | P | P | 36.20 | 11.15 | 9.78 | 0.26 | Slight |
| W0515-7 | P | P | P | 34.80 | 11.19 | 9.44 | 0.00 | No |
| W0515-8 | P | P | P | 38.30 | 11.58 | 7.92 | 0.00 | No |
| W0515-9 | P | P | P | 43.10 | 12.77 | 7.95 | 0.00 | No |
| W0515-10 | P | P | P | 35.20 | 11.12 | 10.44 | 0.00 | No |
| W0515-11 | P | P | P | 41.00 | 12.35 | 7.38 | 0.00 | No |
| W0515-12 | P | P | P | 32.10 | 9.76 | 8.60 | 0.00 | No |

The results shown above in Tables I and II indicate that the dispersions of this disclosure including the retention aid and the sizing agent comprising a wax or a component thereof having an acid value of from 10 mg to 220 mg, KOH/g produce superior articles when the articles are prepared and/or treated with the dispersion.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A dispersion for use in a process for making a treated article, the dispersion comprising:

a solvent;

a sizing agent comprising a wax or a component thereof having an acid value of from 10 mg to 220 mg, KOH/g as measured in accordance with USP 401; and a retention aid comprising a nitrogen-containing polymer of Formula I, Formula I

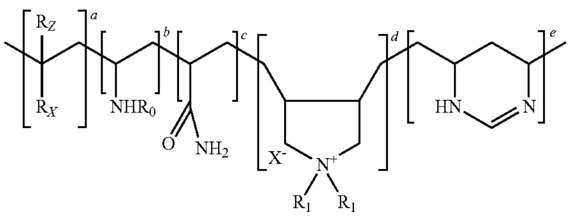

wherein (a), (b), (c), (d), and (e) individually represent the molar percent of each repeating unit included in the nitrogen-containing polymer of Formula I, with each individual molar percent respresented by (a), (b), (c), (d), and (e) ranging from 0 to 100 mol. %, with the sum of (a), (b), (c), (d), and (e) being 100 mol. %, wherein $R_0$ is independently selected from the group consisting of:

H,

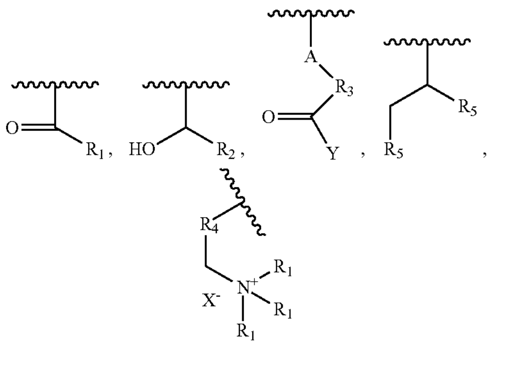

and combinations thereof, and wherein:

$R_z$ is independently selected from H, —$CH_3$, and combinations thereof, $R_x$ is independently selected from H, —OH, —COOH, —$COOR_1$, —$OCOR_1$, —$R_1$, —$R_3OH$, —$OR_1$, —$NR_1R_1$, —$R_3NH_2$, —$NH_2$, —$COO(CH_2)_2N(R_1)_2$, —$COO(CH_2)_2N^+(R_1)_3X^-$, —$COO(CH_2)_3N^+(R_1)_3X^-$, and combinations thereof, with the proviso that when $R_x$ is —$NH_2$, $R_z$ is —$CH_3$, Y is independently selected from H, —OH, —$R_1$, —$OR_1$, —$NR_1R_1$, —$NH_2$, and combinations thereof, Z is independently selected from H, —OH, —C═O, —$R_1$, —$OR_1$, —$NR_1R_1$, —$NH_2$ and combinations thereof, $R_1$ is independently selected from H, a straight chain or branched alkyl or alkenyl containing up to 22 carbons, and combinations thereof, $R_2$ is independently selected from H, a monosaccharide, an oligosaccharide, polysaccharide moiety, a straight or branched alkyl or alkenyl group up to 22 carbons optionally containing a hydroxyl or aldehyde group, and combinations thereof, $R_3$ is independently selected from a straight chain or branched alkyl or alkenyl containing up to 22 carbons or combinations thereof, $R_4$ is independently selected from a straight chain or branched alkyl group containing up to 18 carbons, optionally substituted with a hydroxyl group, and combinations thereof, $R_5$ is independently selected from H, —OH, —COOH, —$COOR_1$, —$OCOR_1$, —$R_1$, —$R_1OH$, —$OR_1$, —$CONH_2$, —CONHCHOHCHO, —$NR_1$, —$NR_1R_1$, —$R_1NH_2$, —$NH_2$, and combinations thereof, A is independently selected from C═O, —$CH_2$, and combinations thereof, and $X^-$ is independently an anion;

wherein the sizing agent is independently selected from a group consisting of a stearate, beeswax, candelilla wax, palmitate, behenate, and combinations thereof.

2. The dispersion as set forth in claim 1 wherein the retention aid is the nitrogen-containing polymer of Formula I and the combined molar percent of (c) and (d) is less than 5 mol. %.

3. The dispersion as set forth in claim 2 wherein $R_0$ is independently selected from the group consisting of H,

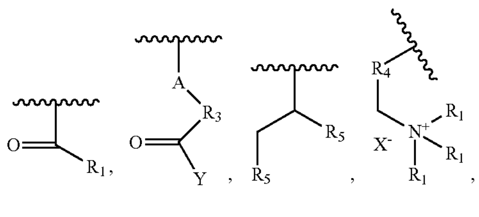

and combinations thereof.

4. The dispersion as set forth in claim 3 wherein $R_0$ is independently selected from the group consisting of H,

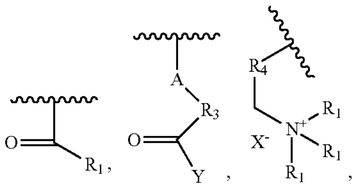

and combinations thereof.

5. The dispersion as set forth in claim 1 wherein the retention aid is the nitrogen-containing polymer of Formula I and the combined molar percent of (a), (b), and (e) is 100 mol. % such that the nitrogen-containing polymer is expressed according to Formula II Formula II

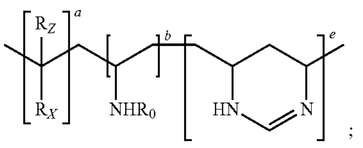

with each individual molar percent respresented by (a), (b), (c), (d), and (e) ranging from 0 to 100 mol. %, with the sum of (a), (b), (c), (d), and (e) being 100 mol. %.

6. The dispersion as set forth in claim 5 wherein the retention aid is independently selected from the group consisting of:

i. the nitrogen-containing polymer of Formula II with the combined molar percent of (b) and (e) being 100 mol. %, and $R_0$ is independently selected from the group consisting of H,

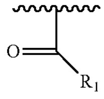

and combinations thereof;

ii. the nitrogen-containing polymer of Formula II with the molar percent of (a) being 100 mol. % and $R_x$ is $—R_3NH_2$; and iii. the nitrogen-containing polymer of Formula II with the molar percent of (b) being 100 mol. %, and $R_0$ independently selected from the group consisting of H,

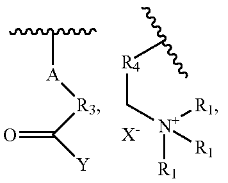

and combinations thereof.

7. The dispersion as set forth in claim 6 wherein the retention aid is independently selected from the group consisting of:

i. the nitrogen-containing polymer of Formula II as further defined according to Formula IIa:

Formula IIa

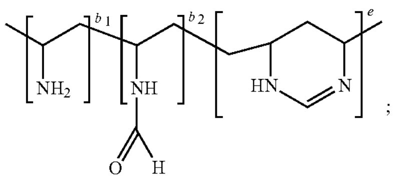

ii. the nitrogen-containing polymer of Formula II as further defined according to Formula IIb:

Formula IIb

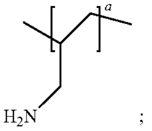

and iii. the nitrogen-containing polymer of Formula II as further defined according to Formula IIc:

Formula IIc

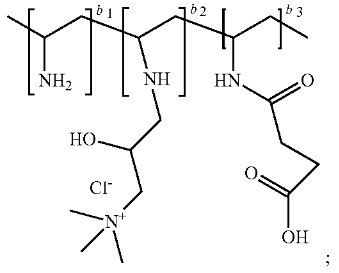

wherein the (a), ($b_1$), ($b_2$), ($b_3$), and (e) represent the molar percent of the individual repeating unit;

wherein each of ($b_1$), ($b_2$), and (e) are present in Formula IIa and the sum of ($b_1$), ($b_2$), and (e) is 100 mol. %,;

wherein (a) is 100 mol. % in Formula IIb, and;

wherein each of ($b_1$), ($b_2$), and ($b_3$) are present in Formula IIc and the sum of ($b_1$), ($b_2$), and ($b_3$) is 100 mol. %.

8. The dispersion as set forth in claim 7 wherein the retention aid is the nitrogen-containing polymer of Formula IIa.

9. The dispersion as set forth in claim 1 wherein the nitrogen-containing polymer has a charge density of >+0.1 meq/g at a pH of 7.

10. The dispersion as set forth in claim 1 wherein the sizing agent has an acid value of from 150 to 220, mg KOH/g.

11. The dispersion as set forth in claim 7 wherein the sizing agent is stearic acid.

12. The dispersion as set forth in claim 1 wherein the sizing agent is beeswax.

13. The dispersion as set forth in claim 1 wherein the sizing agent is present in an amount of from 10 to 50 parts by weight and the retention aid is present in an amount of from 0.1 to 12 parts by weight, each based on 100 parts by weight of the dispersion.

14. The dispersion as set forth in claim 1 further comprising a reaction product of the retention aid and sizing agent.

15. A fiber slurry comprising:

the dispersion as set forth in claim 1;

fibers; and a second solvent that is the same as or different than the solvent of the dispersion.

16. A method of preparing the dispersion as set forth in of claim 1 comprising:

combining the solvent, the sizing agent, and the retention aid.

17. A method of making a treated article, the method comprising:

forming an article from a fiber slurry, with the article having a top surface and a bottom surface; and applying the dispersion of claim 1 to at least one surface of the article to form the treated article.

18. A dispersion for use in a process of making a treated article, the dispersion comprising:

a solvent;

a sizing agent present in an amount of from 10 to 50 parts by weight based on 100 parts by weight of the dispersion, with the sizing agent comprising a wax or the component thereof independently selected from a group consisting of a stearate, beeswax, candelilla wax, palmitate, behenate, and combinations thereof, with the wax or component thereof having an acid value of from 10 mg to 220 mg, KOH/g as measured in accordance with USP 401; and a retention aid present in an amount of from 0.1 to 12 parts by weight based on 100 parts by weight of the dispersion, with the retention aid selected from the group consisting of, i. a nitrogen-containing according to Formula IIa:

Formula IIa

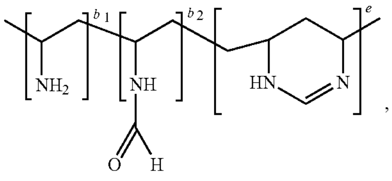

, ii. a nitrogen-containing polymer according to Formula IIb:

Formula IIb

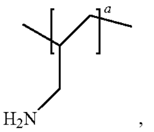

, iii. a nitrogen-containing polymer according to Formula IIc:

Formula IIc

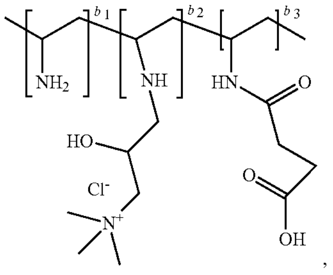

, and iv. combinations thereof, wherein the (a), ($b_1$), ($b_2$), ($b_3$), and (e) represent the molar percent of the individual repeating unit;

wherein each of ($b_1$), ($b_2$), and (e) are present in Formula IIa and the sum of ($b_1$), ($b_2$), and (e) is 100 mol. %,;

wherein (a) is 100 mol. % in Formula IIb; and wherein each of ($b_1$), ($b_2$), and ($b_3$) are present in Formula IIc and the sum of ($b_1$), ($b_2$), and ($b_3$) is 100 mol. %.

19. A dispersion for use in a process for making a treated article, the dispersion comprising:

a solvent;

a sizing agent comprising a wax or a component thereof having an acid value of from 10 mg to 220 mg, KOH/g as measured in accordance with USP 401; and a retention aid comprising a nitrogen-containing polymer of Formula I, Formula I

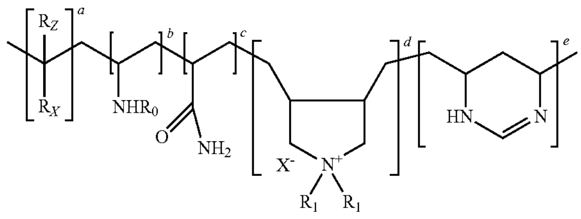

wherein (a), (b), (c), (d), and (e) individually represent the molar percent of each repeating unit included in the nitrogen-containing polymer of Formula I, with each individual molar percent respresented by (a), (b), (c), (d), and (e) ranging from 0 to 100 mol. %, with the sum of (a), (b), (c), (d), and (e) being 100 mol. %, wherein $R_0$ is independently selected from the group consisting of:

H,

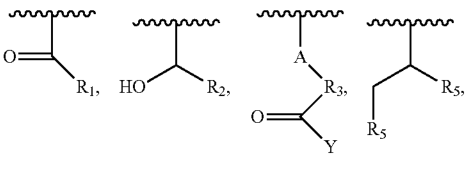

-continued

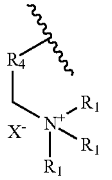

and combinations thereof, and wherein:

$R_z$ is independently selected from H, —$CH_3$, and combinations thereof, $R_x$ is independently selected from H, —OH, —COOH, —$COOR_1$, —$OCOR_1$, —$R_1$, —$R_3OH$, —$OR_1$, —$NR_1R_1$, —$R_3NH_2$, —$NH_2$, —$COO(CH_2)_2N(R_1)_2$, —$COO(CH_2)_2N+(R_1)_3X^-$, —$COO(CH_2)_3N+(R_1)_3X^-$, and combinations thereof, with the proviso that when $R_x$ is —$NH_2$, $R_z$ is —$CH_3$, Y is independently selected from H, —OH, —$R_1$, —$OR_1$, —$NR_1R_1$, —$NH_2$, and combinations thereof, Z is independently selected from H, —OH, —C═O, —$R_1$, —$OR_1$, —$NR_1R_1$, —$NH_2$ and combinations thereof, $R_1$ is independently selected from H, a straight chain or branched alkyl or alkenyl containing up to 22 carbons, and combinations thereof, $R_2$ is independently selected from H, a monosaccharide, an oligosaccharide, polysaccharide moiety, a straight or branched alkyl or alkenyl group up to 22 carbons optionally containing a hydroxyl or aldehyde group, and combinations thereof, $R_3$ is independently selected from a straight chain or branched alkyl or alkenyl containing up to 22 carbons or combinations thereof, $R_4$ is independently selected from a straight chain or branched alkyl group containing up to 18 carbons, optionally substituted with a hydroxyl group, and combinations thereof, $R_5$ is independently selected from H, —OH, —COOH, —$COOR_1$, —$OCOR_1$, —$R_1$, —$R_1OH$, —$OR_1$, —$CONH_2$, —CONHCHOHCHO, —$NR_1$, —$NR_1R_1$, —$R_1NH_2$, —$NH_2$, and combinations thereof, A is independently selected from C═O, —$CH_2$, and combinations thereof, and $X^-$ is independently an anion;

wherein the nitrogen-containing polymer has a charge density of >+0.1 meq/g at a pH of 7.

20. The dispersion as set forth in claim 19 wherein the sizing agent is stearic acid.

21. A method of preparing the dispersion as set forth in claim 19 comprising: combining the solvent, the sizing agent, and the retention aid.

* * * * *